(12) United States Patent
Paglieroni et al.

(10) Patent No.: US 10,007,996 B2
(45) Date of Patent: Jun. 26, 2018

(54) SYSTEM FOR DETECTING OBJECTS IN STREAMING 3D IMAGES FORMED FROM DATA ACQUIRED WITH A MEDIUM PENETRATING SENSOR

(71) Applicant: Lawrence Livermore National Security, LLC, Livermore, CA (US)

(72) Inventors: David W. Paglieroni, Pleasanton, CA (US); N. Reginald Beer, Pleasanton, CA (US)

(73) Assignee: Lawrence Livermore National Security, LLC

( * ) Notice: Subject to any disclaimer, the term of this patent is extended or adjusted under 35 U.S.C. 154(b) by 0 days. days.

(21) Appl. No.: 14/635,822

(22) Filed: Mar. 2, 2015

(65) Prior Publication Data

US 2016/0260222 A1 Sep. 8, 2016

(51) Int. Cl.
*G06T 1/00* (2006.01)
*G06T 7/11* (2017.01)
(Continued)

(52) U.S. Cl.
CPC ............ *G06T 7/0081* (2013.01); *G01S 7/411* (2013.01); *G01S 13/885* (2013.01); *G01V 3/12* (2013.01);
(Continued)

(58) Field of Classification Search
CPC ........ G01S 13/885; G01S 7/412; G01S 13/94; G01S 13/887; G01S 13/931; G01S 7/411;
(Continued)

(56) References Cited

U.S. PATENT DOCUMENTS

| 4,839,654 A | 6/1989 | Ito et al. |
| 5,673,050 A | 9/1997 | Moussally et al. |

(Continued)

FOREIGN PATENT DOCUMENTS

| EP | 0534730 A1 | 3/1993 |
| JP | 05087945 A | 4/1993 |

(Continued)

OTHER PUBLICATIONS

Aliferis, I. et al., "Comparison of the diffraction stack and time-reversal imaging algorithms applied to short-range UWB scattering data," Proc. IEEE Int. Conf. Ultra-Wideband, Singapore, pp. 618-621, 2007.

(Continued)

*Primary Examiner* — Kenny Cese
(74) *Attorney, Agent, or Firm* — Perkins Coie LLP

(57) ABSTRACT

A detection system that detects subsurface objects within a medium and estimates various features of the objects is provided. The detection system receives a streaming sequence of image frames of the medium at various along-medium locations. An image frame contains voxel values (intensities) representing characteristics of the medium across the medium and in the depth (range) direction. The detection system depth-compensates the intensities for determining which voxels are part of an object using an unsupervised binary classifier. The detection system then connects object voxels into distinct objects and recursively estimates the features of those objects as the image frames stream based on the locations and intensities of the object voxels.

20 Claims, 21 Drawing Sheets

(51) Int. Cl.
*G06T 7/194* (2017.01)
*G01S 13/88* (2006.01)
*G01V 3/12* (2006.01)
*G06T 7/00* (2017.01)
*G06K 9/00* (2006.01)
*G01S 7/41* (2006.01)
*G06K 9/32* (2006.01)
*G06K 9/62* (2006.01)
*G06T 15/08* (2011.01)
*H04N 13/128* (2018.01)

(52) U.S. Cl.
CPC ............ *G06K 9/00201* (2013.01); *G06T 7/11* (2017.01); *G06T 7/194* (2017.01); *G06K 9/3241* (2013.01); *G06K 9/6267* (2013.01); *G06T 15/08* (2013.01); *G06T 2207/10028* (2013.01); *H04N 13/128* (2018.05)

(58) Field of Classification Search
CPC ............ G06K 9/3241; G06K 9/00201; G06K 9/6267; G06K 9/00006; G06T 15/08; G06T 2207/10028; G06T 7/0081; G06T 7/11; G06T 7/194; H04N 13/0022; G01V 3/12
See application file for complete search history.

(56) References Cited

U.S. PATENT DOCUMENTS

| | | | |
|---|---|---|---|
| 5,796,363 A | 8/1998 | Mast | |
| 5,835,054 A | 11/1998 | Warhus et al. | |
| 6,445,334 B1 | 9/2002 | Bradley et al. | |
| 6,573,855 B1* | 6/2003 | Hayakawa | G01S 13/88 342/176 |
| 6,982,666 B2 | 1/2006 | Ternes et al. | |
| 7,034,740 B2 | 4/2006 | Witten | |
| 7,262,602 B2 | 8/2007 | Meyer | |
| 7,479,918 B2 | 1/2009 | Johnson et al. | |
| 7,482,968 B2 | 1/2009 | Wuersch et al. | |
| 7,511,654 B1 | 3/2009 | Goldman et al. | |
| 7,796,829 B2 | 9/2010 | Nguyen et al. | |
| 8,094,063 B1 | 1/2012 | Cammerata | |
| 8,325,979 B2 | 12/2012 | Taborowski et al. | |
| 8,482,452 B2 | 7/2013 | Chambers et al. | |
| 8,508,403 B2 | 8/2013 | Paglieroni et al. | |
| 8,618,976 B2 | 12/2013 | Paglieroni et al. | |
| 8,659,467 B1 | 2/2014 | Chambers et al. | |
| 8,854,248 B2 | 10/2014 | Paglieroni et al. | |
| 8,938,114 B2 | 1/2015 | Sarkis | |
| 2005/0068317 A1* | 3/2005 | Amakai | G06T 7/001 345/419 |
| 2007/0188371 A1 | 8/2007 | Callison | |
| 2007/0205937 A1 | 9/2007 | Thompson et al. | |
| 2009/0161975 A1 | 6/2009 | Asai et al. | |
| 2010/0020074 A1* | 1/2010 | Taborowski | G06T 7/0065 345/420 |
| 2011/0080336 A1* | 4/2011 | Leyvand | G06K 9/469 345/156 |
| 2011/0128179 A1 | 6/2011 | Apostolos et al. | |
| 2011/0295510 A1* | 12/2011 | Gulati | G01V 1/28 702/16 |
| 2011/0298655 A1 | 12/2011 | Leva et al. | |
| 2012/0206293 A1 | 8/2012 | Nguyen et al. | |
| 2013/0082857 A1 | 4/2013 | Beer et al. | |
| 2013/0082858 A1 | 4/2013 | Chambers et al. | |
| 2013/0082859 A1 | 4/2013 | Paglieroni et al. | |
| 2013/0082860 A1 | 4/2013 | Paglieroni et al. | |
| 2013/0082861 A1 | 4/2013 | Paglieroni et al. | |
| 2013/0082862 A1 | 4/2013 | Paglieroni et al. | |
| 2013/0082863 A1 | 4/2013 | Paglieroni et al. | |
| 2013/0082864 A1 | 4/2013 | Paglieroni et al. | |
| 2013/0082870 A1 | 4/2013 | Chambers et al. | |
| 2013/0085982 A1 | 4/2013 | Paglieroni et al. | |
| 2013/0176309 A1* | 7/2013 | Sarkis | G01V 8/005 345/422 |

FOREIGN PATENT DOCUMENTS

| | | |
|---|---|---|
| JP | 2002322610 A | 11/2002 |
| JP | 2011032853 A | 2/2011 |
| JP | 2012184624 A | 9/2012 |
| WO | 2010093426 A2 | 8/2010 |

OTHER PUBLICATIONS

Ammari, H. et al., "MUSIC-type electromagnetic imaging of a collection of small three-dimensional inclusions," SIAM J. Sci. Comput., vol. 29, No. 2, pp. 674-709, 2007.

Ammari, H. et al., "A MUSIC algorithm for locating small inclusions buried in a half-space from the scattering amplitude at a fixed frequency," Multiscale Model. Simul., vol. 3, No. 3, pp. 597-628, 2005.

Beer, N.R. et al., "Computational system for detecting buried objects in subsurface tomography images reconstructed from multistatic ultra wideband ground penetrating radar data," LLNL-12311, pp. 1-11, 2010.

Belkebir, K., Bonnard, S. et al., "Validation of 2D inverse scattering algorithms from multi-frequency experimental data," J. Electromag. Waves App., vol. 14:1637-1667, 2000.

Bellomo, L. et al., "Time reversal experiments in the microwave range: description of the radar and results," Prog. Electromag. Res., vol. 104, pp. 427-448, 2010.

Chambers, D.H., "Target characterization using time-reversal symmetry of wave propagation," Int. J. Mod. Phys. B, vol. 21, No. 20, pp. 3511-3555, 2007.

Chambers, D.H. and J.G. Berryman, "Analysis of the time-reversal operator for a small spherical scatterer in an electromagnetic field," IEEE Trans. Ant. Prop., vol. 52, No. 7, pp. 1729-1738, 2004.

Chambers, D.H. and J.G. Berryman, "Target characterization using decomposition of the time-reversal operator: electromagnetic scattering from small ellipsoids," Inv. Prob., vol. 22, pp. 2145-2163, 2006.

Chambers, D.H. and J.G. Berryman, "Time-reversal analysis for scatterer characterization," Phys. Rev. Lett., vol. 92, No. 2, pp. 023902-1-023902-4, 2004.

Chan, K.P. and Y.S. Cheung, "Fuzzy-attribute graph with application to chinese character recognition," IEEE Transactions on Systems, Man, and Cybernetics, vol. 22, No. 1:153-160, Jan./Feb. 1992.

Chatelée, V. et al., "Real data microwave imaging and time reversal," IEEE APS Int. Symp., pp. 1793-1796, 2007.

Chauveau, J. et al., "Determination of resonance poles of radar targets in narrow frequency bands," Proc. 4th Euro. Radar Conf., Munich, pp. 122-125, 2007.

Cmielewski, O. et al., "A two-step procedure for characterizing obstacles under a rough surface from bistatic measurements," IEEE Trans. Geos. Rem. Sens., vol. 45, No. 9, pp. 2850-2858, 2007.

Counts, T. et al., "Multistatic ground-penetrating radar experiments," IEEE Trans. Geos. Rem. Sens., vol. 45, No. 8, pp. 2544-2553, 2007.

Cresp, A. et al., "Investigation of time-reversal processing for surface-penetrating radar detection in a multiple-target configuration," Proc. 5th Euro. Radar Conf., Amsterdam, pp. 144-147, 2008.

Cresp, A. et al., "Time-domain processing of electromagnetic data for multiple-target detection," Conf. Math. Mod. Wave Phen., pp. 204-213, 2009.

Cresp, A. et al., "Comparison of the time-reversal and SEABED imaging algorithms applied on ultra-wideband experimental SAR data," Proc. 7th Euro. Radar Conf., Paris, pp. 360-363, 2010.

Daniels, D.J., "Ground penetrating radar for buried landmine and IED detection," Unexploded Ordnance Detection and Mitigation, J. Byrnes (ed.), Springer, pp. 89-111, 2009.

Daniels, D.J., "A review of GPR for landmine detection," Int. J. Sens. Imag., vol. 7, No. 3, pp. 90-123, 2006.

(56) References Cited

OTHER PUBLICATIONS

Daniels, D.J., "An assessment of the fundamental performance of GPR against buried landmines," Detection and Remediation Technologies for Mines and Minelike Targets XII, Proc. SPIE, vol. 6553, pp. 65530G-1-65530G-15, 2007.
Daniels, D.J. et al., "Classification of landmines using GPR," IEEE RADAR '08, Proceedings, pp. 1-6, 2008.
Devaney, A.J., "Time reversal imaging of obscured targets from multistatic data," IEEE Trans. Ant. Prop., vol. 53, No. 5, pp. 1600-1619, May 2005.
Dubois, A. et al., "Localization and characterization of two-dimensional targets buried in a cluttered environment," Inv. Prob., vol. 20, pp. S63-S79, 2004.
Dubois, A. et al., "Retrieval of inhomogeneous targets from experimental frequency diversity data," Inv. Prob., vol. 21, pp. S65-S79, 2005.
Dubois, A. et al., "Imaging of dielectric cylinders from experimental stepped frequency data," Appl. Phys. Lett., vol. 88, pp. 64104-1-164104-3, 2006.
Feng, X. and M. Sato, "Pre-stack migration applied to GPR for landmine detection," Inv. Prob., vol. 20, pp. S99-S115, 2004.
Fink, M. et al., "Time-reversed acoustics," Rep. Prog. Phys., vol. 63:1933-1995, 2000.
Fink, M. and C. Prada, "Acoustic time-reversal mirrors," Inv. Prob., vol. 17, pp. R1-R38, 2001.
Gader, P. et al., "Detecting landmines with ground-penetrating radar using feature-based rules, order statistics, and adaptive whitening," Trans. Geos. Rem. Sens., vol. 42, No. 11, pp. 2522-2534, 2004.
Gaunaurd, G.C. and L.H. Nguyen, "Detection of land-mines using ultra-wideband radar data and time-frequency signal analysis," IEE Proc. Radar Sonar Navig., vol. 151, No. 5, pp. 307-316, 2004.
Gilmore, C. et al., "Derivation and comparison of SAR and frequency-wavenumber migration within a common inverse scalar wave problem formulation," IEEE Trans. Geos. Rem. Sens., vol. 44, No. 6, pp. 1454-1461, 2006.
Grove, A.J. et al., "General convergence results for linear discriminant updates," Proc. COLT 97, ACM press, pp. 171-183, 1997.
Iakovleva, E. et al., "Multistatic response matrix of a 3-D inclusion in half space and MUSIC imaging," IEEE Trans. Ant. Prop., vol. 55, pp. 2598-2607, 2007.
Iakovleva, E. and D. Lesselier, "Multistatic response matrix of spherical scatterers and the back propagation of singular fields," IEEE Trans. Ant. Prop., vol. 56, No. 3, pp. 825-833, 2008.
Jofre, L. et al., "UWB tomographic radar imaging of penetrable and impenetrable objects," Proc. IEEE, vol. 97, No. 2, pp. 451-464, 2009.
Kuhn, H.W., "The Hungarian method for the assignment problem," Naval Research Logistics Quarterly, 2:83-97, 1955.
Lee, W-H. et al., "Optimizing the area under a receiver operating characteristic curve with application to landmine detection," IEEE Trans. Geos. Rem. Sens., vol. 45, No. 2, pp. 389-397, 2007.
Mast, J.E. and E.M. Johansson, "Three-dimensional ground penetrating radar imaging using multi-frequency diffraction tomography," SPIE, vol. 2275, pp. 196-204, 1994.
Johansson, E.M. and J. Mast, "Three-dimensional ground penetrating radar imaging using synthetic aperture time-domain focusing," SPIE , vol. 2275, pp. 205-214, 1994.
Micolau, G. and M. Saillard, "DORT method as applied to electromagnetic subsurface imaging," Radio Sci., vol. 38, No. 3, 1038, pp. 4-1-4-12, 2003.
Micolau, G. et al., "DORT method as applied to ultrawideband signals for detection of buried objects," IEEE Trans. Geos. Rem. Sens., vol. 41, No. 8, pp. 1813-1820, 2003.
Orlin, J. B. and R.K. Ahuja, "New scaling algorithms for the assignment and minimum mean cycle problems," Mathematical Programming, vol. 54, pp. 41-56, 1992.
Paglieroni, D. and F. Nekoogar, "Matching random tree models of spatio-temporal patterns to tables or graphs," IEEE Symposium on Computational Intelligence and Data Mining, pp. 1-8, Apr. 1-5, 2007.
Paglieroni, D., and K. Ni, "DART Queries," IEEE Transactions on Knowledge and Data Engineering, in Revision, LLNL-JRNL-418760, 2010.
Paglieroni, D.W. et al., "DART-based threat assessment for buried objects Detected with a ground penetrating radar over time," LLNL, pp. 1-7, 2010.
Prada, C. and M. Fink, "Eigenmodes of the time reversal operator: A solution to selective focusing in multiple-target media," Wave Motion, vol. 20, pp. 151-163, 1994.
Saillard, M. et al., "Reconstruction of buried objects surrounded by small inhomogeneities," Inv. Prob., vol. 16, pp. 1195-1208, 2000.
Soumekh, M. et al., "3D wavefront image formation for NIITEK GPR," Radar Sensor Technology XIII Proc. SPIE, vol. 7308, pp. 73080J-1-73080J-12, 2009.
Throckmorton, C. et al., "The efficacy of human observation for discrimination and feature identification of targets measured by the NIITEK ground penetrating radar," Detection and Remediation Technologies for Mines and Minelike Targets IX, Proc. SPIE, vol. 5415, pp. 963-972, 2004.
Chen, HT et al., "Local Discriminant Embedding and Its Variants," IEEE Computer Society on Computer Vision and Pattern Recognition (CVPR), 8 pages, 2005.
Torrione, P.A. et al., "Performance of an adaptive feature-based processor for a wideband ground penetrating radar system," IEEE Trans. Aerospace Elec. Systems, pp. 1-10, 2006.
Torrione, P.A. and L.M. Collins, "Texture features for antitank landmine detection using ground penetrating radar," IEEE Trans. Geos. Rem. Sens., vol. 45, No. 7, pp. 2374-2382, 2007.
Torrione, P.A. et al., "Constrained filter optimization for subsurface landmine detection," Detection and Remediation Technologies for Mines and Minelike Targets XI, Proc. SPIE, vol. 6217, pp, 621710X-1-621710X-12, 2006.
Torrione, P.A., Collins, L. et al., "Application of the LMS algorithm to anomaly detection using the Wichmann/NIITEK ground penetrating radar," Detection and Remediation Technologies for Mines and Minelike Targets VIII, Proc. SPIE, vol. 5089, pp. 1127-1136, 2003.
Tortel, H. et al., "Decomposition of the time reversal operator for electromagnetic scattering," J. Electromag. Waves. App., vol. 13, pp. 687-719, 1999.
Tsai, W-H and K-S Fu, Error-Correcting Isomorphisms of Attributed Relational Graphs for Pattern Analysis, IEEE Transactions on Systems, Man, and Cybernetics, vol. 9, No. 12, pp. 757-768, 1979.
Vitebskiy, S., Carin, L., "Resonances of perfectly conducting wires and bodies of revolution buried in a lossy dispersive half-space," IEEE Trans. Ant. Prop., vol. 44, No. 12, pp. 1575-1583, 1996.
Vitebskiy, S. et al., "Short-pulse plane-wave scattering from buried perfectly conducting bodies of revolution," IEEE Trans. Ant. Prop., vol. 44, No. 2, pp. 143-151, 1996.
Wilson, J.N. et al., "A large-scale systematic evaluation of algorithms using ground-penetrating radar for landmine detection and discrimination," IEEE Trans. Geos. Rem. Sens., vol. 45, No. 8, pp. 2560-2572, 2007.
Yavuz, M.E. and F.L. Teixeira, "Full time-domain DORT for ultrawideband electromagnetic fields in dispersive, random inhomogeneous media," IEEE Trans. Ant. Prop., vol. 54, No. 8, pp. 2305-2315, 2006.
Yavuz, M.E. and F.L. Teixeira, "On the sensitivity of time-reversal imaging techniques to model perturbations," IEEE Trans. Ant. Prop., vol. 56, No. 3, pp. 834-843, 2008.
Yavuz, M.E. and F.L. Teixeira, "Space-frequency ultrawideband time-reversal imaging," IEEE Trans. Geos. Rem. Sens., vol. 46, No. 4, pp. 1115-1124, 2008.
Zhu, Q. and L.M. Collins, "Application of feature extraction methods for landmine detection using the Wichmann/NIITEK ground-penetrating radar," IEEE Trans. Geos. Rem. Sens., vol. 43, No. 1, pp. 81-85, 2005.
Zhuge, X. et al., "UWB array-based radar imaging using modified Kirchhoff migration," Proc. 2008 IEEE Conf. Ultra-Wideband, vol. 3, pp. 175-178, 2008.

\* cited by examiner

SYSTEM FOR DETECTING OBJECTS IN STREAMING 3D IMAGES FORMED FROM DATA ACQUIRED WITH A MEDIUM PENETRATING SENSOR

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, medical, and other technologies seek to identify the presence of an object within a medium. For example, some technologies detect the presence of buried landmines in a roadway or a field for military or humanitarian purposes. Such technologies may use ultra wideband ground-penetrating radar ("GPR") antennas that are mounted on the front of a vehicle that travels on the roadway or across the field. The antennas are directed into the ground with the soil being the medium and the top of the soil or pavement being the surface. GPR systems can be used to detect not only metallic objects but also non-metallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the medical field, computer-assisted tomography uses X-rays to generate tomography images for detecting the presence of abnormalities (i.e., subsurface objects) within a body. In the engineering field, GPR systems have been designed to generate spatial images of the interior of concrete structures such as bridges, dams, and containment vessels to assist in assessing the integrity of the structures. In such images, the subsurface objects represented by such images tend to appear as distinct bright spots. In addition to referring to a foreign object that is within a medium, the term "object" also refers to any characteristic of the medium (e.g., crack in the medium and change in medium density) that is to be detected.

A real-time computational system for detecting volumes in ground penetrating radar (GPR) images needs to image the radar return signals and process the images from successive sampling locations of the vehicle as it travels so that, in the steady state, the return signals for one sampling location are processed within the time between samplings. Moreover, in the case of a vehicle that detects landmines, a real-time system may need to detect the presence of the landmine in time to stop the vehicle from hitting the landmine. A system for detecting subsurface objects is described in U.S. Pat. No. 8,854,248 entitled "Real-Time System for Imaging and Object Detection with a Multistatic GPR Array," which is hereby incorporated by reference. In some applications, it may be important to not only detect the presence of a subsurface object but also determine the shape, size, and other features of the object. For example, when looking for underground utilities, it may be helpful to distinguish between large water mains and smaller conduits for electrical wire, identify the splitting or merging of pipes, and so on.

DETAILED DESCRIPTION

Figure 1:
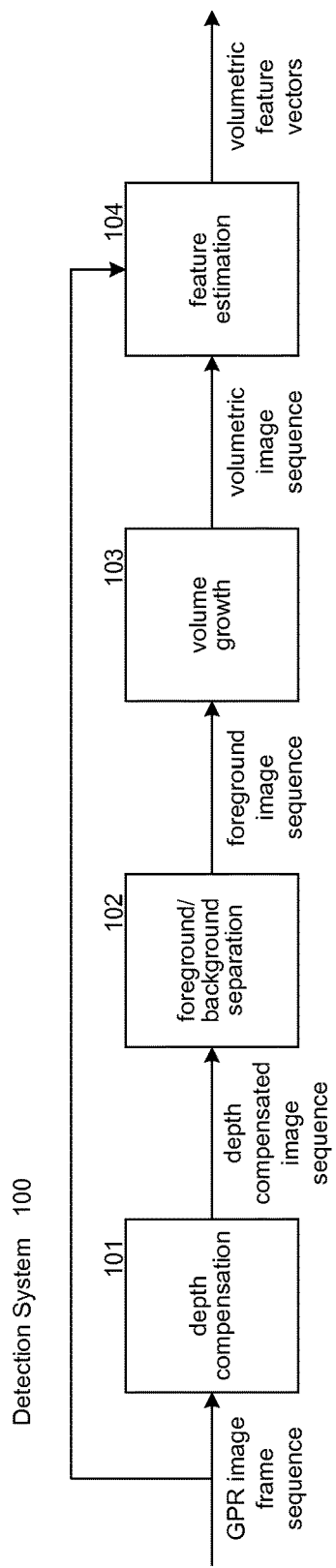
FIG. 1 is a block diagram that illustrates the overall processing of the detection system in some embodiments.

A method and system for detecting subsurface objects within a medium is provided. In some embodiments, a detection system receives a sequence of images of the medium, also referred to as frames or image frames. In general, the image frames are formed using return signals from a medium penetrating sensor. For example, the image frames may be collected by a vehicle equipped with a GPR as the vehicle travels down a road. As return signals are collected from the emitted GPR signals, image frames of the subsurface of the medium are generated for various locations down the road, referred to as down-track or along-track (along-medium) locations. Each image frame contains pixels that each represent the intensity or radiance for a subsurface volume at a certain depth and at a certain location across the road, referred to as a cross-track (cross-medium) location. Pixels that comprise volumes are also referred to as voxels. Each voxel contains the intensity or radiance derived from the return signals. The detection system processes the images in sequence. For each voxel of an image, the detection system generates a depth-compensated intensity based on the intensity of the voxel and statistically derived characteristics of the intensities of voxels at the same depth in prior image frames of the sequence. The detection system depth-compensates the intensities to prevent the image from being dominated by return signals from near the surface. It does this by normalizing the intensities across the depths to account for variations resulting from differences in depth (e.g., attenuation resulting from path length of the signal and return signal). The detection system identifies voxels whose depth-compensated intensities are statistically significant. For example, a depth-compensated intensity for a voxel may be statistically significant if it is greater than a standard deviation above a mean depth-compensated intensity for voxels at the same depth in a certain number of prior images. The detection system assumes that voxels with depth-compensated intensities that are not statistically significant are definitely not part of a subsurface object. The detection system assumes, however, that not all statistically significant intensities represent voxels that are part of a subsurface object. For example, the depth-compensated intensities for voxels surrounding a subsurface object may be statistically significant, but may be smaller than the depth-compensated intensities for voxels that are part of that subsurface object. The detection may use an unsupervised binary classifier that learns a threshold intensity that serves to separate depth-compensated intensities that are part of a subsurface object and those lower intensities that are not. To find the threshold, the classifier may analyze the distribution of depth-compensated intensities over a range of previously processed image frames to identify an intensity that divides the distribution into two classes of intensities characterized by (1) good separation between the classes, referred to as between-class separation, and (2) concentration of the intensity histogram within each class, referred to as within-class concentration. The detection system classifies the depth-compensated intensities of an image that are above the threshold intensity as representing a voxel that is part of a subsurface object.

In some embodiments, the detection system identifies voxels that have been classified as part of a subsurface object, referred to as object voxels, that are close enough together to be considered part of the same object. The detection system processes each image frame to identify object voxels within the image frame that are close enough together to be part of the same object. A collection of such object voxels within an image frame (e.g., a GPR image frame in 2D that lies in a vertical plane normal to the direction of vehicle travel) is referred to as a spot. When the detection system encounters a spot that does not appear to be part of a previously identified object, it records the creation or opening of a new object. From image frame to image frame, when a spot is close enough to a previously identified object, the detection system adds the spot to that object, which is referred to as growing the object. The detection system determines whether the spots present in an image frame indicate that an object terminates, an object splits into multiple objects, or multiple objects merge into a single object. When processing an image frame, the detection system identifies spots in the image frame that are connected to previously identified objects based on closeness of the voxels in the spot to voxels in the objects. When a spot is not connected to an object, the detection system creates a new object that initially contains only that spot. When a spot is connected to multiple objects, the detection system merges the objects by creating an object that contains the spot and the spots of the multiple connected objects. When an object is connected to only one spot, the detection system adds the spot to the object to grow the object. When an object is connected to multiple spots, the detection system splits the object into multiple objects by creating one object from each of these multiple spots. The detection system terminates objects that are not connected to a spot in incoming image frames, objects that are merged into a single object, and objects that are split into multiple objects.

In some embodiments, the detection system employs an unsupervised classifier adapted to classify current data representing a physical characteristic into two classes. The classifier is provided, as input, a distribution (e.g., a discrete probability distribution) of values of prior data. The distribution may be based on a histogram with a count for each distinct value of the prior data. The classifier analyzes the distribution to learn a value threshold for the prior data that maximizes an objective function based on between-class separation and within-class concentration of the two classes. The classifier may perform an analysis on each possible value threshold to find the one that separates the prior data into the two classes that maximize the objective function. Once the value threshold is learned based on analysis of the prior data, the classifier can be used to classify values of the current data that are below the value threshold to be in one class and that are above the value threshold to be in the other class. The detection system uses the classifier to find an intensity threshold that defines the voxels with intensities above the intensity threshold as object voxels and below the intensity threshold as non-object voxels.

FIG. 1 is a block diagram that illustrates the overall processing of the detection system in some embodiments. The detection system 100 receives a sequence of GPR image frames, identifies objects within the image frames and estimates various features of those objects. The detection system performs depth compensation (d. c.) 101, foreground/background separation 102, volume growth 103, and feature estimation 104. The detection system performs depth compensation to account for voxel intensity attenuation at increasing voxel depth. For example, intensities associated with object voxels near the surface will tend to have larger magnitudes than intensities associated with object voxels that are deeper. Depth compensation may represent the intensities as some number of standard deviations away from the mean of intensities previously encountered at the same depth. The detection system performs foreground/background separation to identify object voxels. A depth-compensated intensity for an object voxel is considered to lie in the foreground. The detection system initially identifies depth-compensated intensities that are considered to be statistically significant (e.g., a certain number of standard deviations above the mean over all depths) and discards intensities that are not statistically significant as being in the background. The detection system then applies an unsupervised binary classifier to classify each of the statistically significant voxel intensities as an object voxel (i.e., in the foreground) or indeterminate (i.e.; as neither part of an object nor part of the background). The detection system then performs volume growth to identify the object voxels that are close enough to each other in the same image frame or different image frames to be considered part of the same object. The detection system then recursively updates features for each object (such as volume size, total energy, orientation, and so on) as image frames are processed in succession.

Depth and Along-Medium Compensation for Image Voxel Intensities

In some embodiments, the detection system generates depth-compensated intensities for voxels in an image of a medium, where the image was formed using return signals from a medium penetrating sensor. For example, the medium may be soil, water, or air, and the intensities may be derived from return signals of electromagnetic, sonar, or seismic waves propagated through the medium. Media are typically lossy, i.e., the strength of the return signal tends to attenuate as the signal propagates through the medium. A target image contains intensities for voxels that each correspond to a specific depth and a specific cross-medium (e.g., cross-track) location within the medium. The term "depth" refers to the range dimension of wave propagation (e.g., down when GPR waves are sent from the surface into the soil and up when sonar is sent from the bottom of the ocean to the surface). For each depth, the detection system computes intensity statistics for voxels that occur at that depth. Depth-compensated voxel intensities for voxels at depth z are computed by comparing those intensities to intensity statistics associated with voxels at depth z in general.

The voxel intensity statistics for depth z include a mean and a variance for the intensities of voxels at depth z. For voxels at depth z, a depth-compensated voxel intensity may be based on the number of standard deviations above some statistically significant intensity, which may be defined as one or more standard deviations above the mean for voxels at depth z. The detection system may also map depth-compensated intensities to integers on a decibel ($\log_{10}$) scale clipped to some maximum value. For a specific image frame k in a sequence of image frames, the detection system may calculate the statistics for depth z based on intensities at depth z in a prescribed number of image frames that occur before image frame k in the sequence. This process is referred to as along-medium (e.g., along-track) compensation. The detection system may base the statistics at depth z only on a prescribed limited number of image frames prior to image frame k so that the statistics can adjust more quickly to changes in one or more properties of the medium as the sensor moves along the medium. For example, if the medium is soil in the ground, then the soil composition may change from clay to sand. Since clay and sand attenuate the return signals at different rates, along-medium compensation allows the voxel intensity statistics to quickly adapt from being based on the properties of clay to being based on the properties of sand as the sensor travels along the surface of the ground. In some embodiments, the detection system uses depth-compensated intensities to detect a characteristic of the medium, such as an object present in the medium (e.g., a landmine buried beneath a road).

Unsupervised Binary Classifier for Discrete Probability Distributions of Prior Data In some embodiments, the detection system uses a classifier that classifies data representing a physical characteristic into two classes. For example, the two classes may represent voxels that are part of an object within some medium and voxels that are not part of an object within that medium. The detection system generates a discrete probability distribution of values of prior data, such as depth-compensated intensities for image voxels. The detection system provides a specification of between-class separation to quantify the separation of values between the classes, and a specification of within-class concentration to quantify the concentration of values within a class. The detection system identifies a threshold value within the discrete probability distribution of prior data values based on a combination of the between-class separation and within-class concentration. The detection system seeks to jointly maximize the between-class separation and within-class concentration. The detection system then designates the threshold value for classifying the current data into one of two classes. By using discrete probability distributions of prior data values as training data, the unsupervised classifier learns the natural binary class separation in the data, rather than the separation between extreme outliers and the vast majority of the data (which is not useful here). Moreover, discrete probability distributions require little memory and are easy to update (e.g., as new image frames are added to the prior data).

The detection system may generate a discrete probability distribution from a sequence of image frames of a medium in which each image frame corresponds to an along-medium location and contains voxels with values representing intensities (which may be depth-compensated) at various depths and cross-medium locations at that along-medium location. The detection system may apply the classifier to classify a voxel from the current image frame as being part of or not part of an object within the medium. The values of the discrete probability distribution may be integers within some range, and the discrete probability distribution may be based on a histogram representing the number of occurrences of each integer value in the data. In some embodiments, the detection system may use a specification of the between-class separation that is based on the difference between the mean of values within each class, and a specification of within-class concentration based on a population weighted combination of standard deviations of the values within each class. The detection system may use a combination of the between-class separation and within-class concentration given by the ratio of the difference between a mean of values within each class to a standard deviation derived from a population weighted combination of standard deviations of values within each class.

In some embodiments, the detection system identifies the threshold value by calculating statistics for deriving the between-class separation and within-class concentration based on a pass through discrete values of the discrete probability distribution in ascending order, and a pass through discrete values of the discrete probability distribution in descending order, and then merging the statistics of the passes. Calculating the statistics for each pass may further include, for each possible threshold value, calculating the mean of values, weighted by the number of occurrences of each value in the data, to one side of the possible threshold value, and calculating the variance of values, weighted by the number of occurrences of each value in the data, to one side of the possible threshold value. For at least one of the passes, the detection system, for each possible threshold value, calculates the sum of values, weighted by the number of occurrences of each value in the data, to one side of the possible threshold value. The detection system may apply the classifier to classify, based on some physical characteristic, values of the current data that are below the threshold value into one class, and values of the current data that are above the threshold value into the other class. The discrete probability distribution of the prior data serves as training data for the unsupervised classifier. The classifier may adapted to classify the data into more than two classes based on the overall between-class separation and within-class concentration for the data in each pair of classes.

Growing Volumes in Streaming Images of Depth-Compensated Voxel Intensities

In some embodiments, the detection system grows objects detected in a medium to determine the volumetric portion of the medium that an object occupies. The detection system accesses a streaming sequence of image frames of the medium in order to grow the volumes. Each image frame contains voxels of various depths and cross-medium locations at a specific along-medium location. Each voxel has an intensity that, for example, represents radiance of a return signal from a ground-penetrating radar. To enable volume growing, the detection system classifies each voxel as being an object voxel or not an object voxel based on analysis of depth-compensated intensities in which the intensities are normalized to account for attenuation associated with depth. Within each image frame in a sequence of image frames, the detection system extracts spots (sets of spatially connected voxels that belong to an object) associated with any objects that are present. The detection system also determines whether these spots are connected to spots extracted from previous image frames. When a spot extracted from the current image frame is not connected to a spot extracted from a previous image frame, the detection system opens a new object with that spot. When the spot extracted from the current image frame is connected to only one spot extracted from a previous image frame, the detection system grows the object that contains the spot from a previous image frame by adding the spot from the current image frame to the object. When the spot extracted from the current image frame is connected to multiple spots from previous image frames, the detection system merges the objects that contain the spots from the previous image frames and adds the spot from the current image frame to the merged object. When an object contains no spots from previous image frames that are connected to a spot from the current image frame, the object is closed (i.e., it is no longer allowed to grow), and it is destroyed if it is transient (e.g., its extent in the along-medium dimension or its volume is below some specified threshold). When an object contains a spot from a previous image frame that is connected to multiple spots in the current image frame, the detection system splits the object by first closing the object, and then for each of those multiple spots in the current image frame, opening one new object.

In some embodiments, for a spot extracted from the current image frame that is connected to multiple objects from previous image frames, the detection system closes each connected object, and for open objects, when an object is not connected to a spot or is connected to multiple spots from the current image frame, the detection system closes the object. When a closed object does not satisfy a minimum object criterion, the detection system may designate the object as being destroyed. The minimum object criterion may be based, for example, on minimum extent along the medium or minimum volume. Closed objects that do not satisfy the minimum object criterion may result from certain characteristics of the medium that are not of interest, such as transient artifacts of the medium. The detection system may consider object voxels that lie in the same spot neighborhood to be connected, and to be part of the same spot. The detection system may recursively update various object features, such as volume (voxel volume times the number of object voxels), energy (sum of intensities of object voxels), and extent (along the medium, across the medium, or in depth) as the image frames stream.

Depth Integration of Depth-Compensated Image Voxel Intensities

In some embodiments, the detection system generates depth-integrated intensities for a target image frame of a medium. The target image frame contains intensities for voxels with specific depth and cross-medium locations at a specific along-medium location. Depth integration converts the sequence of intensities at various depths for each specific along-medium and cross-medium location into a single intensity. Depth integration collapses the intensities for an image frame into a line of intensities across the medium. Thus, a sequence of image frames is collapsed into a sequence of lines of intensity across the medium (an image in two dimensions). For each voxel intensity in the target image frame, the detection system generates a depth-compensated intensity that is normalized to account for attenuation associated with depth. Within the target image frame, at each cross-medium location, the detection system generates a value based on the depth-compensated intensities at various depths that are considered to be statistically significant. To generate depth-compensated intensities, the detection system may, for each of a plurality of depths, generate a mean and a standard deviation of the intensities at that depth in prior images, and then set the depth-compensated intensities at that depth to be the number of standard deviations above a statistically significant intensity for that depth. In some embodiments, the depth-integrated intensity is the sum of or the maximum of the statistically significant depth-compensated intensities for a given across-medium location over all depths.

In some embodiments, the detection system applies an unsupervised binary classifier to compensated intensities for voxels within a depth-integrated image frame to classify those voxels as part of an object or not part of an object. The threshold value for the classifier may be generated based on analysis of compensated intensities for voxels from prior depth-integrated image frames. The detection system may also grow an area representing an object in a depth integrated 2D image from object voxels that are connected. Area growth may include adding a set of connected object voxels from the current along-medium location to object voxels within the area from previous along-medium locations, merging areas from previous along-medium locations that are connected to the same set of connected object voxels at the current along-medium location, and splitting an area from previous along-medium locations that is connected to disconnected sets of connected object voxels at the current along-medium location. The detection system may generate depth-integrated intensities for the various cross-medium locations by combining statistically significant depth-compensated intensities for an image frame, and then use an unsupervised binary classifier to determine whether the depth-integrated intensity at a given cross-medium location is consistent with the presence of an object at some depth at that cross-medium location. As the depth-integrated image streams, the detection system may recursively update estimates for features of objects associated with connected object voxels in a depth-integrated image based on statistically significant depth-compensated intensities over all depths at the along-medium and across-medium locations of object voxels in the depth-integrated image. For example, the detection system may estimate the volume of an object based on the number of object voxels over all depths.

System for Detecting Objects in Streaming 3D Images Formed from Data Acquired with a Medium Penetrating Sensor In some embodiments, the detection system detects objects within a medium. The detection system accesses a streaming sequence of image frames of the medium. Each image frame has an associated along-medium location and contains intensities for voxels at various depths and cross-medium locations at that along-medium location. The detection system generates a depth-compensated intensity for each voxel by normalizing voxel intensities at various depths to account for attenuation at those depths. Based on their depth-compensated intensities, the detection system uses an unsupervised classifier to classify voxels as object voxels (voxels that are part of a detected object) or non-object voxels. In some embodiments, sequences of depth-compensated image frames may be collapsed into two-dimensional depth-integrated images of depth-compensated voxels. In this embodiment, the detection system uses an unsupervised binary classifier to classify voxels in the depth-integrated image as object voxels or non-object voxels. In some embodiments, the detection system uses an unsupervised classifier to classify voxels as object voxels or non-object voxels based on depth-compensated intensities that are also subjected to along-medium compensation. In some embodiments, a depth-compensated intensity for voxels at a given depth may be based on the number of standard deviations above a statistically significant intensity for that depth, and the statistically significant intensity may be based on one or more standard deviations above a mean of the intensities for that depth. The detection system may be used to more generally identify occurrences of physical characteristics of a medium such soil type, temperature variations in the medium, and so on.

Integration with Database of Additional Information

In some embodiments, the detection system may interface with one or more external databases to provide additional information on a detected object. For example, the detection system may access an object database of previously detected objects such as objects detected when previously traveling down a road checking for landmines. The object database may contain for each previously detected object various characteristics such as location (e.g., cross-medium location, along-medium location, and depth), volume, extent, energy, jaggedness, non-linearity, and so on. The object database may even store the intensities of each voxel of an object on a frame-by-frame basis. When an object is detected, the detection system may check the object database to determine whether that object was previously detected. If not, then the detection system may report that the object is a newly detected object and add the object to the object database. For example, a new object detected in the roadway of a bridge may represent a recent crack in the bridge. If the object was previously detected, then the detection system may compare the object of the new detection to the object of the previous detection to identify changes to the object. If the changes satisfy a detection threshold (e.g., percent of volume change), then the detection system may indicate that the object has changed significantly.

As another example, the detection system may access a structure database of known structures such as a database that stores information on underground utility structures such as water mains, drainage vaults, storm drains, sewer lines, pumps, electrical lines, cable lines, and so on or other underground structures that may not be considered utilities such as a tunnel connecting two buildings, a support structure for a building, and so on. The structure database may store location, path, volume, perimeter coordinates, type, and so on of each known structure. When an object is detected, the detection system may check the structure database to determine whether the object corresponds to a known structure. For example, if the object has a location, volume, and extent that is similar to that of a known water main, the detection system may indicate that the object likely corresponds to that water main. The detection system may also generate a confidence measure indicating the likelihood that the object is the known structure. For example, the detection system may represent the object and the known structure as feature vectors of their characteristic features (e.g., volume), and the confidence measure may be based on a distance between the feature vectors. The detection system may also weight some of the features higher than others when generating the confidence measure. If the object does correspond to a known structure, the detection system may compare the object to the known structure to identify any changes. For example, if a sequence of objects appears to correspond to a sewer line and the gaps between the objects are significant, the detection system may indicate that the sewer line has changed (e.g., damaged as a result of earth movement). If the object does not correspond to a known structure, then the object may represent an unauthorized or unknown structure. The detection system may also use both the known structure database and the object database of previously detected objects to identify when an object represents an object that is neither a known structure nor previously detected object. For example, the detection system may be used to identify the presences of an unauthorized tunnel. The detection system may also use the confidence measure to indicate the likelihood that the object corresponds to a previously detected object.

In the following, a mathematical description of detection system processing is provided, followed by a description of its various components.

Mathematical Description

1. Buried Volume Detection in Streaming GPR Image Frames
1.1 Statistical Voxel Classification as Background in the Current Image Frame Table 1 contains a description of some symbols used to describe the detection system.

TABLE 1

| | |
|---|---|
| k: | index of the GPR image frame |
| x: | cross-track (column) coordinate for image frame pixels |
| z: | depth (row) coordinate for image frame pixels ($\geq 0$) |
| z*: | critical depth beyond which the voxel radiance threshold for background characterization decreases no further |
| $u_k(x, z)$: | the radiance $\geq 0$ of pixel (x, z) in GPR image frame k (i.e., voxel (x, z, k)) |
| $\mu_k(z)$, $\sigma_k^2(z)$: | mean and variance of voxel radiance from frames $u_0 \ldots u_k$ on depth plane z statistics could be calculated within the moving window $u_{k-w} \ldots u_k$ of frames $(\mu_k(z), \sigma_k^2(z)) = (\mu_k(z^*), \sigma_k^2(z^*))$ if $z \geq z^*$ |

The detection system calculates a depth-compensated voxel radiance (i.e., depth-compensated intensity) according to equation 1.1.

$$\tilde{u}_k(x, z) = \begin{cases} \dfrac{\max[0, u_k(x, z) - \mu_k(z) - n_\sigma \sigma_k(z)]}{\sigma_k(z)} & \sigma_k(z) > 0 \\ 0 & \sigma_k(z) = 0 \end{cases} \quad (1.1)$$

where $\tilde{u}_k(x,z)=0$ if $u_k(x,z)$ is statistically insignificant, that is, $u_k(x,z) \leq \mu_k(z) + n_\sigma \sigma_k(z)$; where $\tilde{u}_k(x,z)$ is radiance expressed as the number of standard deviations in radiance value above the statistical significance level; and where $n_\sigma \geq 1$ (e.g., $n_\sigma=3$) is a statistical significance parameter (which a user could be allowed to set). As $n_\sigma$ increases, there will be fewer statistically significant voxels, and it becomes more difficult to classify a voxel as part of an object.

The detection system expresses the depth-compensated voxel radiance as an 8-bit integer on a $\log_{10}$ (dB) scale according to equation 1.2:

$$v_k(x, z) = int\left[\min\left[255, \frac{255\log_{10}(1 + \tilde{u}_k(x, z))}{\log_{10}(1 + \tilde{u}_{max})}\right]\right] \in \{0, \ldots, 255\} \quad (1.2)$$

where $\tilde{u}_{max}$ is an assumed value for $$\max_{x,z,k}$$

$\tilde{u}_k(x,z)$. For example, if $\tilde{u}_{max}=9$, the depth-compensated voxel radiance is represented by equation 1.3:

$$v_k(x,z)=int[255 \min[1, \log_{10}(1+\tilde{u}_k(x,z))]]. \quad (1.3)$$

In this equation, $u_k(x,z)$ at the $9\sigma_k(z)$ level or more maps to 255. Such a depth-compensated voxel radiance is tolerant of large uncertainties in the dynamic range of voxel radiances $u_k(x,z) \geq 0$.

The detection system classifies a voxel (x, z, k) as part of soil (or other medium) in the background according to equations 1.4a-c:

$$v_k(x,z) \leq \mu_{v,k} + \sigma_{v,k} \quad (1.4a)$$

where $$\mu_{v,k} = \underset{x,z,k'=0\ldots k: v_{k'}(x,z)>0}{\text{mean}} v_{k'}(x, z) \quad (1.4b)$$

$$\sigma_{v,k}^2 = \underset{x,z,k'=0\ldots k: v_{k'}(x,z)>0}{\text{var}} v_{k'}(x, z) \quad (1.4c)$$

1.2 Unsupervised Voxel Classification as Foreground in the Current Image Frame

To classify a voxel as being in the foreground (i.e., an object voxel), the detection system generates a histogram $$h_k = \{h_k(v)\}v \overset{255}{\underset{=}{}} 0$$

for values of voxels $\{v_j(x,z)\}_{j=0}^{k}$ in the foreground of GPR images up to frame k that is recursively updated according to equation 1.5:

if $v_k(x,z) > \mu_{v,k} + \sigma_{v,k}$ then $h_k(v_k(x,z)) = h_{k-1}(v_k(x,z))+1$ (1.5)

The detection system converts the voxel histogram to a discrete voxel probability distribution $P_k = \{P_{k,i}\}_{i=0}^{n_k-1}$ where $P_{k,i} = P[v \leq v_i']$ and $$\{v_i'\}_{i=0}^{n_k-1}$$

is the set of $n_k$ distinct voxel values, sorted in ascending order, such that $h_k(v) > 0$. By applying an unsupervised binary classifier for foreground voxels to this discrete voxel distribution, the detection system computes a threshold probability as represented by equation 1.6:

$$P^* = \text{binaryClassifyThreshold}(P_k, \mu_{crit}=0, J_{crit}=2) \quad (1.6)$$

The detection system initializes $P^*$ to zero before the GPR image frames are streamed and does not change it on a given frame k if $P_k$ is not binary class separable. To reduce computational cost, the detection system may update $P^*$ only when $k = i\Delta_k$ with $\Delta_k > 1$.

The detection system classifies a voxel (x,z,k) as part of a volume according to equations 1.7 and 1.8:

$$v_k(x,z) \geq v^* \quad (1.7)$$

where $$v^* = v_i^{*\prime}, i^* = \text{smallest } i=0 \ldots n_k-1 : P[v \leq v_i'] > P^* \quad (1.8)$$

In general, $P^*$ is expected to be relatively insensitive to high-end outliers because cumulative probabilities associated with high-end outliers are always close to one. Also, once k becomes sufficiently large, $P^*$ should begin to adjust very gradually because $h_k$ will change very slowly.

1.3 Rules for Growing Volumes Along the Track

To identify the voxels representing an object, the detection system considers a set of foreground voxels that are spatially connected within a given GPR image frame to be a spot area, also referred to as a spot. The detection system considers two voxels in the same GPR image frame to be connected if one lies in a local neighborhood of the other. A local neighborhood may be a rectangular area centered on a voxel with an extent of $\pm w_x$ meters in the cross-track (x) direction and $\pm w_z$ meters in the depth (z) direction (e.g., $w_x = w_x$ = voxel cross-track extent).

The detection system models spot volumes, also referred to as volumes, as sequences of connected spots extracted from sequences of GPR image frames. The detection system considers two spots to be connected if any voxel from one lies in a local neighborhood of any voxel from the other. Such a local neighborhood may be a rectangular volume with an extent of $\pm w_x$ meters in the cross-track (x) direction, $\pm w_y$ meters in the along-track (y) direction, and $\pm w_z$ meters in the depth (z) direction (e.g., $w_x = w_y = w_z$ = voxel cross-track extent).

The detection system applies rules to grow volumes along a track as GPR image frames are received. The rules specify actions to be taken in response to various volumetric states detected on the current GPR image frame. The rules, each of which correspond to a different volumetric state, are summarized in Table 2.

TABLE 2

| Rule/Volumetric State | Description of State | Action | Description of Action |
|---|---|---|---|
| birth | no previous frame volume is connected to the current frame spot | open | open new volume with current frame spot |
| merge | more than one previous frame volume is connected to the current frame spot | open, close | open new merge volume with current frame spot close each previous frame volume that is connected to current frame spot |
| split | another current frame spot is connected to a previous frame volume that the current frame spot is connected to | open, close | open new split volume with current frame spot close each previous frame volume that is connected to current frame spot |
| death | the previous frame volume is not connected to any current frame spot | close | close the previous frame volume |
| transient | the previous frame volume was closed and its extent was less than some critical length along the track | destroy | flag the previous frame volume that was closed as destroyed |
| growth | the previous frame volume is connected to only one current frame spot, and that spot is connected to only one volume | grow | add the current frame spot to the previous frame volume |

By applying these rules, the detection system treats disconnected volumes as distinct, separates connected volumes when a split or merge condition is detected, and destroys volumes whose along-track extent is too short. The detection system does not separate a single volume into multiple volumes unless a split or merge state is encountered. As a result, the detection system does not distinguish a single pipe along the track that expands (say into a bladder) and then contracts from a single pipe along the track that intersects and passes through a single pipe across the track. In each case, the detection system identifies that there is only one object. In the latter case, the along-track and cross-track pipes can be decomposed into separate components in a subsequent forensic computer-assisted mapping analysis.

1.4 Recursions for Radiance and Geometry Features of Evolving Volumes

The detection system estimates various features of an object. A volume V that contains m voxels with radiance $u_i > 0$, and coordinates $x_i$ may be represented by equation 1.9:

$$V \triangleq \{(u_i, x_i)\}_{i=0}^{m-1} \tag{1.9}$$

where $x_i = [x_i, k_i, z_i]^T$ represents image (column, frame index, row) coordinates, or $x_i = [e_i, n_i, d_i]^T$ represents pixel (easting, northing, depth) coordinates.

The detection system estimates the size feature of a volume according to equation 1.10:

$$\text{voxelVolume}(V) = m, \text{volume}(V) = m\Delta_x \Delta_y \Delta_z \tag{1.10}$$

where $\Delta_x$ is the width of a voxel, $\Delta_z$ is the height of a voxel, and $\Delta_y$ is the distance along the track between successive image frames.

The detection system estimates energy features of a volume according to equation 1.11:

$$\text{energy}(V) = \sum_{i=0}^{m-1} u_i, \text{brightness}(V) = \text{energy}(V)/m \tag{1.11}$$

The detection system estimates location features using radiance weighted volume centroids as represented by equation 1.12:

$$\bar{x}(V) = \frac{1}{m} \sum_{i=0}^{m-1} u_i \, x_i \tag{1.12}$$

The detection system estimates the extent features according to equation 1.13:

$$\text{extent}(V) = \left[ x_{min} = \min_{i=0\ldots m-1} x_i, x_{max} = \max_{i=0\ldots m-1} x_i, x_{max} - x_{min} \right] \tag{1.13}$$

where the min and max of a vector are term-wise minima and maxima.

The detection system estimates orientation features from the spatial covariance of voxel locations, accounting for voxel radiance. The centroid of V discounting voxel radiance is represented by equation 1.14:

$$\mu(V) = \frac{1}{m} \sum_{i=0}^{m-1} x_i \tag{1.14}$$

and the spatial covariance of V is represented by equation 1.15:

$$R(V) = \sum_{i=0}^{m-1} u_i^2 [x_i - \mu(V)][x_i - \mu(V)]^T \Big/ \sum_{i=0}^{m-1} u_i^2 \quad (1.15)$$

If the eigenvalues and corresponding eigenvectors of R are $\lambda_0 \geq \lambda_1 \lambda_2$ and $[\phi_0, \phi_1, \phi_2]$, where $\phi_i = [\phi_{ix}, \phi_{iy}, \phi_{iz}]$, then if $\lambda_0 > \lambda_1$, $\phi_0$ will be the major axis of V in 3D. In this case, the detection system estimates the orientation of V in the xy plane according to equation 1.16:

$$\theta_{yx}(V) = \tan^{-1}(\phi_{0y}/\phi_{0x}) \quad (1.16)$$

For $x_i = [e_i, n_i, d_i]^T$, the orientation is the azimuth angle. The tilt of V is the angle between $\phi_0$ and the xy plane. The detection system estimates the tilt as the angle between $[\phi_{0x}, \phi_{0y}, \phi_{0z}]$ and $[\phi_{0x}, \phi_{0y}, 0]$ according to equation 1.17:

$$\text{tilt}(V) = \cos^{-1} \frac{[\phi_{0x}, \phi_{0y}, \phi_{0z}] \cdot [\phi_{0x}, \phi_{0y}, 0]}{(\phi_{0x}^2 + \phi_{0y}^2 + \phi_{0z}^2)^{1/2} (\phi_{0x}^2 + \phi_{0y}^2)^{1/2}} \quad (1.17)$$

If $\lambda_0 = \lambda_1$, there is no dominant eigenvector and the detection system assumes the major axis of V in 3D is ambiguous and sets $\theta_{yx}(V) = \text{tilt}(V) = 0$ by default.

The detection system estimates elongation features along the major axis for the projections of V onto the planes that contain the eigenvectors $[\phi_0, \phi_1]$ and $[\phi_0, \phi_2]$ according to equation 1.18:

$$\text{elongation}(V) = (\lambda_0/\lambda_1, \lambda_0/\lambda_2) \geq 1 \quad (1.18)$$

The detection system computes a single elongation that incorporates information from all three dimensions by combining elongations in these orthogonal planes in various ways. For example, the detection system may use the square root of the product of the elongations in equation 1.18 according to equation 1.19:

$$\text{elongation}(V) = \lambda_0/\sqrt{\lambda_1 \lambda_2} \geq 1 \quad (1.19)$$

which is the dominant eigenvalue divided by the geometric mean of the two lesser eigenvalues.

The detection system can represent volumes either as sets of voxels or as feature vectors. The detection system can update feature-based representations recursively with complexity that does not depend on the number of voxels in the volume. As a result, the detection system can update the volumes in real time as the GPR image frames stream.

Table 3 provides recursion formulas for evolving volume features, and Table 4 provides merge feature formulas for merged volumes. In these tables, $\Omega_k \triangleq \{\text{voxels } (u,x) \text{ in frame } k \text{ to be added to } V_{k-1} \text{ to produce } V_k\}$.

TABLE 3

$$\text{voxelVolume}(V_k) = \text{voxelVolume}(V_{k-1}) + \sum_{u \in \Omega_k} 1$$

$$\text{energy}(V_k) = \text{energy}(V_{k-1}) + \sum_{u \in \Omega_k} u$$

$$\bar{x}(V_k) = \left[ \bar{x}(V_{k-1}) \text{voxelVolume}(V_{k-1}) + \sum_{(u,x) \in \Omega_k} ux \right] \Big/ \text{voxelVolume}(V_k)$$

TABLE 3-continued $$\text{extent}(V_k) = \begin{bmatrix} x_{min}(V_k) = \min[x_{min}(V_{k-1}), \min_{x \in \Omega_k} x], \\ x_{max}(V_k) = \max[x_{max}(V_{k-1}), \max_{x \in \Omega_k} x], \\ x_{max}(V_k) - x_{min}(V_k) \end{bmatrix}$$

$$\mu(V_k) = \left[ \mu(V_{k-1}) \text{voxelVolume}(V_{k-1}) + \sum_{x \in \Omega_k} x \right] \Big/ \text{voxelVolume}(V_k)$$

$$R(V_k) = \frac{R(V_{k-1})\text{energy}(V_{k-1}) + \sum_{(u,x) \in \Omega_k} u^2 [x - \mu(V_k)][x - \mu(V_k)]^T}{\text{energy}(V_k)}$$

TABLE 4

$$\text{voxelVolume}(V_0 \cup V_1) = \text{voxelVolume}(V_0) + \text{voxelVolume}(V_1)$$
$$\text{energy}(V_0 \cup V_1) = \text{energy}(V_0) + \text{energy}(V_1)$$

$$\bar{x}(V_0 \cup V_1) = \frac{\bar{x}(V_0)\text{energy}(V_0) + \bar{x}(V_1)\text{energy}(V_1)}{\text{energy}(V_0 \cup V_1)}$$

$$\text{extent}(V_0 \cup V_1) = \begin{bmatrix} x_{min}(V_0 \cup V_1) = \min[x_{min}(V_0), x_{min}(V_1)], \\ x_{max}(V_0 \cup V_1) = \max[x_{max}(V_0), x_{max}(V_1)], \\ x_{max}(V_0 \cup V_1) - x_{min}(V_0 \cup V_1) \end{bmatrix}$$

$$R(V_0 \cup V_1) = \frac{R(V_0)\text{energy}(V_0) + R(V_1)\text{energy}(V_1)}{\text{energy}(V_0 \cup V_1)}$$

2. Simplified Buried Volume Detection in Streaming Depth-Integrated GPR Horizontal Plane Images When the goal is limited to finding the (x,y) locations of localized objects, the detection system may use a simplified volume detection by using depth integration to first reduce the 3D GPR image (a sequence of GPR image frames that lie in vertical planes normal to the direction of vehicle travel) to a 2D horizontal plane image. The detection system may perform depth integration for depth-compensated voxels $\tilde{u}_k(x,z)$ (see equation 1.1) as the mean or maximum of the radiances at an (x,y) location. The means is represented by equation 2.1:

$$\tilde{u}_k(x) = \frac{1}{n_z} \sum_{z=0}^{n_z-1} \tilde{u}_k(x, z) \quad (2.1)$$

where $\tilde{u}_k(x)$ is the depth-integrated radiance for cross-track location x of frame z and $n_z$ is the number of rows in a GPR image frame. The detection system may perform depth integration based on the depth-compensated radiances expressed as an integer as represented by equation 2.2 or 2.3:

$$v_k(x) = \frac{1}{n_z} \sum_{z=0}^{n_z-1} v_k(x, z) \quad (2.2)$$

$$v_k(x) = \max_{z=0 \ldots n_z-1} v_k(x, z) \quad (2.3)$$

where $v_k(x)$ is the depth-integrated radiance for cross-track location x of frame z.

The detection system can then directly apply the foreground/background separation and volume growing algorithms described in Section 1 for the case of 3D GPR images to streaming 2D horizontal plane images by using equations 1.2-1.8 with $\tilde{u}_k(x,z) \rightarrow \tilde{u}_k(x)$ and $v_k(x,z) \rightarrow v_k(x)$. By reaching back to the GPR image frames, each of which were collapsed into a single column in a sequence of GPR horizontal plane image columns across the track, the detection system can estimate volumetric features as the image frames stream using the volume feature recursions in Table 3. A limitation of this approach is that depth integration discards the information needed to separate pieces of objects with the same (x, y) locations that occur at different depths.

The detection system grows areas of the sequence of 2D horizontal plane images by identifying foreground depth-integrated radiances of each image that are connected. Radiances are connected when one is in a line segment neighborhood (e.g., a cross-track distance) of the other. The detection system represents connected radiances as a line segment. The detection system grows areas along the 2D horizontal plane as a collection of connected line segments. The rules for growing an area using depth-integrated radiances is much like that for grow volumes as represented by Table 5.

TABLE 5

| Rule/Spot State | Description of State | Action | Description of Action |
| --- | --- | --- | --- |
| birth | no previous frame area is connected to the current frame line segment | open | open new area with current frame line segment |
| merge | more than one previous frame area is connected to the current frame line segment | open, close | open new merge area with current frame line segment close each previous frame area that is connected to current frame line segment |
| split | another current frame line segment is connected to a previous frame area that the current frame line segment is connected to | open, close | open new split area with current frame line segment close each previous frame area that is connected to current frame line segment |
| death | the previous frame area is not connected to any current frame line segment | close | close the previous frame area |
| transient | the previous frame area was closed and its extent was less than some critical length along the track | destroy | flag the previous frame area that was closed as destroyed |
| growth | the previous frame area is connected to only one current frame line segment, and that line segment is connected to only one area | grow | add the current frame line segment to the previous frame line segment |

Table 6 provides recursion formulas for evolving area features, and Table 7 provides merge feature formulas for merged areas. Let $x_{k0}(n)$ and $x_{k1}(n)$ represent the start and end locations of line segment n of frame z.

TABLE 6

$$area_k = area_{k-1} + \sum_{n=0}^{N-1} [x_{k1}(n) - x_{k0}(n) + 1]$$

$$volume_k = volume_{k-1} + \sum_{n=0}^{N-1} \sum_{x=x_{k0}(n)}^{x_{k1}(n)} \sum_{z=0}^{n_z-1} [u_k(x,z) > 0]$$

$$energy_k = energy_{k-1} + \sum_{n=0}^{N-1} \sum_{x=x_{k0}(n)}^{x_{k1}(n)} \sum_{z=0}^{n_z-1} u_k(x,z)$$

$$brightness_k = energy_k / volume_k$$

$$x, y, zCentroid_k = \left[ x, y, zCentroid_{k-1} \cdot energy_{k-1} + \sum_{n=0}^{N-1} \sum_{x=x_{k0}(n)}^{x_{k1}(n)} \sum_{z=0}^{n_z-1} [(x, y, z) u_k(x, z)] / energy_k \right]$$

$$startFrame_k = startFrame_{k-1},$$
$$endFrame_k = k, extent_k = endFrame_k - startFrame_k + 1$$

TABLE 7

$$area\ 0_k = area\ 0_k + area\ 1_k$$
$$volume\ 0_k = volume\ 0_k + volume\ 1_k$$
$$energy\ 0_k = energy\ 0_k + energy\ 1_k$$
$$brightness\ 0_k = energy\ 0_k / volume\ 0_k$$

$$x, y, zCentroid\ 0_k = \frac{x, y, zCentroid\ 0_k \cdot energy\ 0_k + x, y, zCentroid\ 1_k \cdot energy\ 1_k}{energy\ 0_k + energy\ 1_k}$$

TABLE 7-continued startFrame $0_k$ = min [ startFrame $0_k$, startFrame $1_k$ ]
endFrame $0_k$ = max [ endFrame $0_k$, endFrame $1_k$ ]
extent $0_k$ = endFrame $0_k$ − startFrame $0_k$ + 1

3. Buried Volume Tracking

In applications that mostly involve extended objects (such as utility pipe mapping), volume center tracks are typically more relevant than volume centroids. The detection system may estimate volume center tracks as described below.

The detection system may alternatively represent an extended volume V (see equation 1.9) according to equation 3.1:

$$V = \{A_k(V) \triangleq \{(u_{ki}, x_{ki} = [x_{ki}, y_{ki}, z_{ki}])\}_{i=0}^{n_{ki}-1}\}_{k=k_{min}}^{k_{max}} \quad (3.1)$$

as a sequence of regions $A_k(V)$ on m successive image frames with indices that range from $k_{min}$ to $k_{max}$. The detection system may represent the center track of V according to equation 3.2:

$$L(V) = \{\bar{x}(A_k(V))\}_{k=k_{min}}^{k_{max}} \quad (3.2)$$

as a sequence of $m = k_{max} - k_{min} + 1$ centroids (one per image frame) as represented by equation 3.3:

$$\bar{x}(A_k(V)) = [\bar{x}_0(A_k(V)), \bar{x}_1(A_k(V)), \bar{x}_2(A_k(V))]^T = \frac{1}{n_{ki}} \sum_{i=0}^{n_{ki}-1} u_{ki} x_{ki} \quad (3.3)$$

The detection system may estimate features of the center track of V. The detection system estimates the path length of L (V) as the sum of incremental contributions from pairs of successive image frames as represented by equation 3.4:

$$pathLength(L(V)) = \sum_{k=k_{min}}^{k_{max}} d_k(V), \quad (3.4)$$

$$d_k(V) \triangleq \|\bar{x}(A_{k+1}(V)) - \bar{x}(A_k(V))\|$$

The detection system estimates the extent of L (V) as represented by equation 3.5:

$$extent(L(V)) = \left[\bar{x}_{min} = \min_{k=k_{min}...k_{max}} \bar{x}(A_k(V)), \bar{x}_{max} = \max_{k=k_{min}...k_{max}} \bar{x}(A_k(V)), \bar{x}_{max} - \bar{x}_{min}\right] \quad (3.5)$$

The nonlinearity of L(V) measures the degree to which the center track is nonlinear. The detection system may measure the nonlinearity using the linear regression residual for a line in 3D. This residual is non-negative and has units of either meters or image voxels. It decreases to zero as the center track becomes a perfect line in 3D and increases as the center track further deviates from linear. In some applications, either the $\bar{x}_0(A_k(V))$ or the $\bar{x}_1(A_k(V))$ coordinate varies along the volume center track, as these coordinates represent (cross-track, down-track) or (easting, northing). These coordinates may be interchanged as needed to ensure that the $\bar{x}_0(A_k(V))$ coordinate varies along the center track. The 3D line regression problem is based on two overdetermined systems of linear equations as represented by equations 3.6a and 3.6b:

$$[x_1 x_2] = \phi[a_1 a_2] \quad (3.6a)$$

where $a_1$ and $a_2$ are vectors of size 2×1, and $$\bar{x}_i \triangleq \begin{bmatrix} \bar{x}_i(A_{k_{min}}(V)) \\ \cdot \\ \cdot \\ \bar{x}_i(A_{k_{max}}(V)) \end{bmatrix}, \phi \triangleq [\bar{x}_0 \ 1] \quad (3.6b)$$

The nonlinearity of L(V) is then the root sum of squares for residuals $\varepsilon(a_1)$ and $\varepsilon(a_2)$ associated with least-squares coefficients $a_1$ and $a_2$ for coordinates $x_1$ and $x_2$ as represented by equation 3.7:

$$nonlinearity(L(V)) = \varepsilon(a_1, a_2) = [\varepsilon^2(a_1) + \varepsilon^2(a_2)]^{1/2} \quad (3.7)$$
$$= \left[x_1^T(I - \phi(\phi^T\phi)^{-1}\phi^T)^2 x_1 + x_2^T(I - \phi(\phi^T\phi)^{-1}\phi^T)^2 x_2\right]^{1/2}$$

The jaggedness of L(V) (the opposite of smoothness) measures the degree to which the center track follows a trajectory characterized by sudden changes in direction. For example, jaggedness should be zero for linear or circular tracks, and larger for staircase tracks. This quantity is non-negative. In some embodiments, the detection system may use a measure with units of angle in radians that varies from 0 π. For $k = k_{min} + \Delta_k \ldots k_{max}$ and some $\Delta_k > 0$, the detection system represents the incremental center track direction vector that terminates on image frame k according to equation 3.8:

$$\dot{P}_k = [\dot{x}_k, \dot{y}_k, \dot{z}_k] = \bar{x}(A_k(V)) - \bar{x}(A_{k-\Delta_k}(V)) \quad (3.8)$$

For $\dot{P}_k$, the detection system represents the angle of the pointing direction in the xy horizontal plane (e.g., the azimuth) according to equation 3.9:

$$\alpha_k = \tan^{-1}(\dot{y}_k/\dot{x}_k) \quad (3.9)$$

and the angle of the pointing direction away from the horizontal plane (e.g., the tilt) according to equation 3.10:

$$\tau_k = \cos^{-1}\frac{[\dot{x}_k, \dot{y}_k, \dot{z}_k]\cdot[\dot{x}_k, \dot{y}_k, 0]}{(\dot{x}_k^2+\dot{y}_k^2+\dot{z}_k^2)^{1/2}(\dot{x}_k^2+\dot{y}_k^2)^{1/2}} \quad (3.10)$$

as in equations 1.16 and 1.17. For $k=k_{min}+2\Delta_k \ldots k_{max}$, the detection system estimates the instantaneous change in the angle estimates according to equation 3.11:

$$\dot{\alpha}_k=|\alpha_k-\alpha_{k-\Delta_k}|, \dot{\tau}_k=|\tau_k-\tau_{k-\Delta_k}| \quad (3.11)$$

The detection system estimates the jaggedness of L(V) according to equation 3.12:

$$\text{jaggedness}(L(V)) = \operatorname*{var}^{1/2}_{k=k_{min}+\Delta_k \ldots k_{max};\Delta_k}\dot{\alpha}_k, \quad (3.12)$$

$$\operatorname*{var}^{1/2}_{k=k_{min}+\Delta_k \ldots k_{max};\Delta_k}\dot{\tau}_k \text{ or } \frac{1}{2}\left[\operatorname*{var}^{1/2}_{k=k_{min}+\Delta_k \ldots k_{max};\Delta_k}\dot{\alpha}_k + \operatorname*{var}^{1/2}_{k=k_{min}+\Delta_k \ldots k_{max};\Delta_k}\dot{\tau}_k\right]$$

Volumetric features and center track characterizations promote confidence, understanding, and awareness as to the spatial topology of buried objects. They enable maps of the subsurface to be generated with greater ease and precision. Where underground objects have legacy maps, "as-built" drawings, or schematics, these features, including shape, slope and orientation, are critically useful to locating and identifying objects of interest in highly dense environments to correlate system detections with specific installed (buried) objects. This confidence improvement over existing methods also extends to features that correlate with buried object status, such as the presence of leaks around pipes, wall corrosion, tunnel collapse, etc. These additional capabilities will be useful prior to clearing areas for safe operations such as digging, plowing, traversing, or mapping in the presence of high-energy systems (power lines, gas and petroleum pipelines, landmines, etc.).

4. Unsupervised Binary Classifier for Foreground Voxels

The detection system uses an unsupervised binary classifier to decide whether non-background (i.e., statistically significant) voxels are foreground (i.e., object) voxels. In the following, $\Omega=\{x_i\}_{i=0}^{m-1}$ represents a set of m scalar voxel values (i.e., intensities). The detection system uses an unsupervised algorithm to automatically compute the decision threshold t* that divides $\Omega$ into the two subsets $\Omega_0$ and $\Omega_1$ that maximize a suitable objective function. The objective function is designed to increase in value as class separation increases on the one hand (i.e., between-class separation), and as the class densities become more tightly distributed on the other (i.e., within-class concentration). This objective function promotes tightly distributed classes that are widely separated. The algorithm then automatically determines whether or not the resulting class separation is sufficiently large to justify two classes.

The classes $\Omega_0$ and $\Omega_1$ satisfy the following conditions:
(i) $\Omega_0 \cup \Omega_1 = \Omega$
(ii) $\Omega_0 \cap \Omega_1$ is empty
(iii) maximum x value in $\Omega_0$ < minimum x value in $\Omega_1$
(iv) $\Omega_0$ and $\Omega_1$ maximize the prescribed objective function.

4.1 Objective Function for Binary Class Separation

To handle possible redundancy in the values that occur in $\Omega$, the detection system transforms $\Omega$ into the set $\Phi=\{(y_i, w_i)\}_{i=0}^{n-1} \cdot \{y_i\}_{i=0}^{n-1}$, which is the set of distinct values $x_k \varepsilon \Omega$ sorted in ascending order, and where there are $1 \leq n \leq m$ distinct values in $\Omega$. The symbol $w_i \geq 1$ represents the number of times the value $y_i$ occurs in $\Omega$. If n<2, there is only one class. Otherwise, the possible decision thresholds are represented by equation 4.1:

$$t_i=(y_i+y_{i-1})/2, i=1\ldots n-1 \quad (4.1)$$

and the optimal decision threshold is $t^*=t_{i^*}$. At decision threshold $t_i$, the detection system divides $\Phi$ into two subsets, namely $\Phi_0(t_i)=\{(y_k,w_k)\}_{k=0}^{i-1}$ and $\Phi_1(t_i)=\{(y_k,w_k)\}_{k=i}^{n-1}$.

Accounting for redundancy in the elements of $\Omega$, $\Phi_0(t_i)$ and $\Phi_1(t_i)$ have populations represented by equations 4.2a and 4.2b:

$$n_0(t_i)=\sum_{k=0}^{i-1} w_k > 0 \quad (4.2a)$$

$$n_1(t_i)=\sum_{k=i}^{n-1} w_k = m - n_0(t_i) > 0 \quad (4.2b)$$

and means or centers represented by equations 4.3a and 4.3b:

$$\mu_0(t_i)=\frac{1}{n_0(t_i)}\sum_{k=0}^{i-1} w_k y_k \quad (4.3a)$$

$$\mu_1(t_i)=\frac{1}{n_1(t_i)}\sum_{k=i}^{n-1} w_k y_k > \mu_0(t_i) \quad (4.3b)$$

and variances o represented by equations 4.4a and 4.4b:

$$\sigma_0^2(t_i)=\frac{1}{n_0(t_i)}\sum_{k=0}^{i-1} w_k y_k^2 - \mu_0^2(t_i) \quad (4.4a)$$

$$\sigma_1^2(t_i)=\frac{1}{n_1(t_i)}\sum_{k=i}^{n-1} w_k y_k^2 - \mu_1^2(t_i) \quad (4.4b)$$

The detection system represents the between-class separation by equation 4.5:

$$\Delta\mu(t_i)=\mu_1(t_i)-\mu_0(t_i)>0 \quad (4.5)$$

and a weighted average of within-class variances by equation 4.6:

$$\sigma^2(t_i)=\frac{n_0(t_i)\sigma_0^2(t_i)+n_1(t_i)\sigma_1^2(t_i)}{n_0(t_i)+n_1(t_i)} \quad (4.6)$$

The within-class variance provides an estimate of how tightly distributed the class densities are.

The detection system represents the objective function by equation 4.7:

$$J(t_i)=\text{step}[\mu_1(t_i)-\mu_0(t_i)-\Delta\mu_{crit}]\cdot\left[\frac{\mu_1(t_i)-\mu_0(t_i)}{\sigma(t_i)}\right] \quad (4.7)$$

The objective function generates a non-negative value and a non-zero value only when the argument of the step function is non-negative (i.e., $\mu_1(t_i)-\mu_0(t_i)>\Delta\mu_{crit}$ where step(x)=1 if x>0 and 0 otherwise). The objective function specifies the class separation $\Delta\mu(t_i)$ in units of within-class standard deviations.

4.2 Linear Time Scanning

For n>1, the detection system determines the optimal decision threshold $t^*=t_{i^*}$ by finding the smallest $i \in \{1 \ldots n-1\}$ that satisfies the conditions represented by equations 4.8a-4.8c:

$$i^* = \arg\max_{i=1\ldots n-1} J(t_i) \tag{4.8a}$$

$$\mu_1(t_{i^*}) - \mu_0(t_{i^*}) > \Delta\mu_{crit} \tag{4.8b}$$

$$J(t_{i^*}) > J_{crit} \tag{4.8c}$$

The two parameters of the binary classifier are the absolute class separation constraint $\Delta\mu_{crit}$ (expressed in native units of the scalar features) and the statistical class separation constraint $J_{crit}$ (expressed as a number of standard deviations in scalar feature value). While both are specified based on the application, $J_{crit}$ is typically >1 and often 2 by default. The detection system eliminates these constraints by choosing $\Delta\mu_{crit} \leq 0$ (the default) and $J_{crit} \leq 0$.

Once the n>1 elements $y_i$ of $\Phi$ have been sorted in ascending order (an $O(n \log_2 n)$ time complexity proposition), the detection system computes $\{J(t_i)\}_{i=1}^{n-1}$ in linear time (i.e., with $O(n)$ complexity) in two passes over $\Phi$ as follows:

left-to-right pass:

$$n_{0,1}=w_0, n_{1,1}=m-n_{0,1}, \mu_{0,1}=w_0 y_0, \sigma_{0,1}^2=w_0 y_0^2, t_1=(y_1+y_0)/2$$

for i=2 . . . n−1

$$n_{0,i}=n_{0,i-1}+w_{i-1}, n_{1,i}=m-n_{0,i}, \mu_{0,i}=\mu_{0,i-1}+w_{i-1} y_{i-1}$$

$$\sigma_{0,i}^2=\sigma_{0,i-1}^2+w_{i-1} y_{i-1}^2, t_i=(y_i+y_{i-1})/2$$

right-to-left pass:

$$\mu_{1,n-1}=w_{n-1} y_{n-1}, \sigma_{1,n-1}^2=w_{n-1} y_{n-1}^2$$

for i=n−2 . . . 1

$$\mu_{1,i}=\mu_{1,i+1}+w_i y_i, \sigma_{1,i}^2=\sigma_{1,i+1}^2+w_i y_i^2$$

merge passes:
for i=1 . . . n−1

$$\mu_{0,i}/=n_{0,i}, \mu_{1,i}/=n_{1,i}, \sigma_{0,i}^2/=n_{0,i}, \sigma_{1,i}^2/=n_{1,i}$$

$$\sigma_{0,i}^2 -= \mu_{0,i}^2, \sigma_{1,i}^2 -= \mu_{1,i}^2, \Delta\mu_i = \mu_{1,i} - \mu_{0,i}$$

$$\sigma_i^2 = (n_{0,i}\sigma_{0,i}^2 + n_{1,i}\sigma_{1,i}^2)/m, J_i=0$$

if $\Delta\mu_i > \Delta\mu_{crit}$ $$J_i = \Delta\mu_i / \sigma_i$$

Component Description

Figure 2:
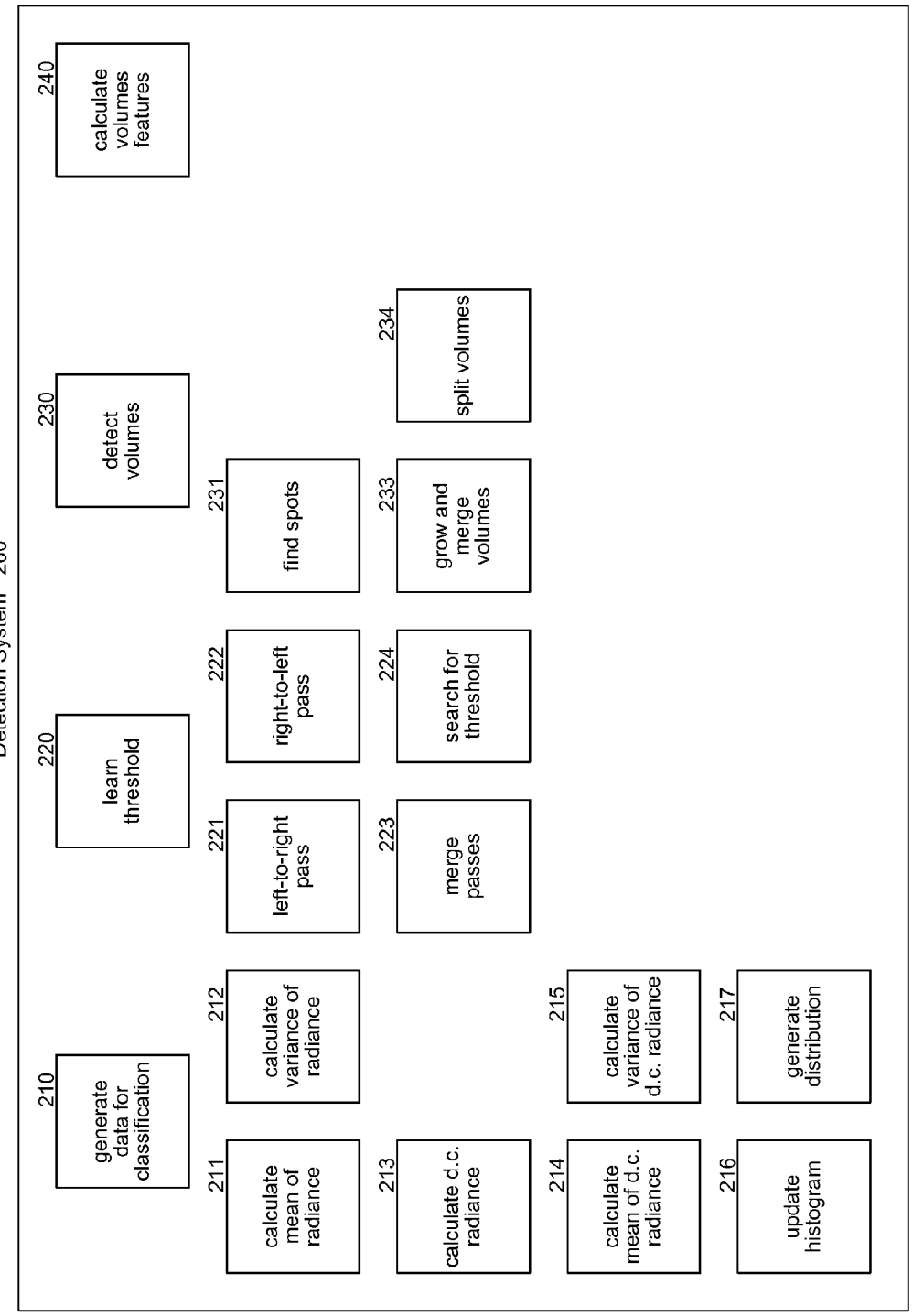
FIG. 2 is a block diagram that illustrates components of the detection system in some embodiments.

FIG. 2 is a block diagram that illustrates components of the detection system in some embodiments. The detection system 200 includes a "generate data for classification" component 210, a "learn threshold" component 220, a "detect volumes" component 230, and a "calculate volume features" component 240. The "generate data for classification" component generates data for the classification of statistically significant intensities as being part of an object or not part of an object. The "generate data for classification" component invokes a "calculate mean of radiance" component 211, a "calculate variance of radiance" component 212, a "calculate depth-compensated radiance" component 213, a "calculate mean of depth-compensated radiance" component 214, a "calculate variance of depth-compensated radiance" component 215, an "update histogram" component 216, and a "generate distribution" component 217. The "learn threshold" component invokes a "left-to-right pass" component 221, a "right-to-left pass" component 222, a "merge passes" component 223, and a "search for threshold" component 224. The "detect volumes" component invokes a "find spots" component 231, an "grow and merge volumes" component 233, and a "split volumes" component 234.

The computing devices and systems on which the detection system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the detection system. The data transmission media is used for transmitting data via transitory, propagating signals or carrier waves (e.g., electromagnetism) via a wired or wireless connection.

The detection system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

Figure 3:
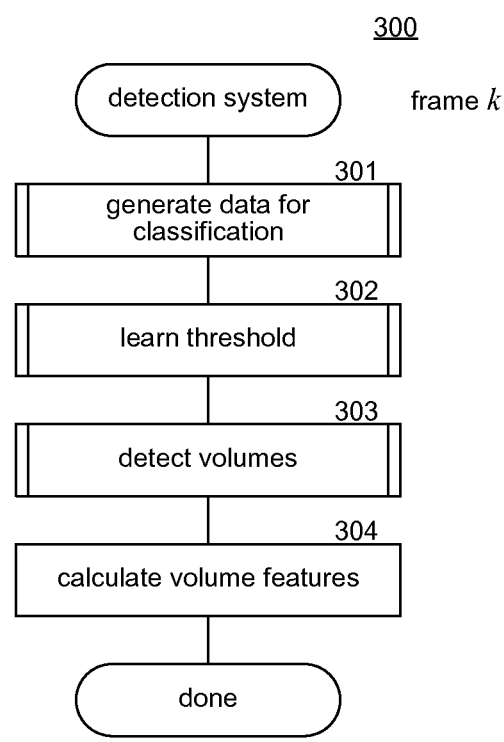
FIG. 3 is a flow diagram that illustrates the overall processing of the detection system in some embodiments.

FIG. 3 is a flow diagram that illustrates the overall processing of the detection system in some embodiments. The detection system 300 processes image frames on a frame-by-frame basis. In block 301, the detection system invokes the "generate data for classification" component to generate the classification data for the current image. In block 302, the detection system invokes the "learn threshold" component to determine the intensity threshold for object voxels for the current image based on the classification data. In block 303, the detection system invokes the "detect volumes" component to track volumes based on the object voxels of the current image. In block 304, the detection system invokes the "calculate volume features" component to estimate features of the volumes based on volumes extending to the current image. The detection system then completes the processing of the current frame.

Figure 4:
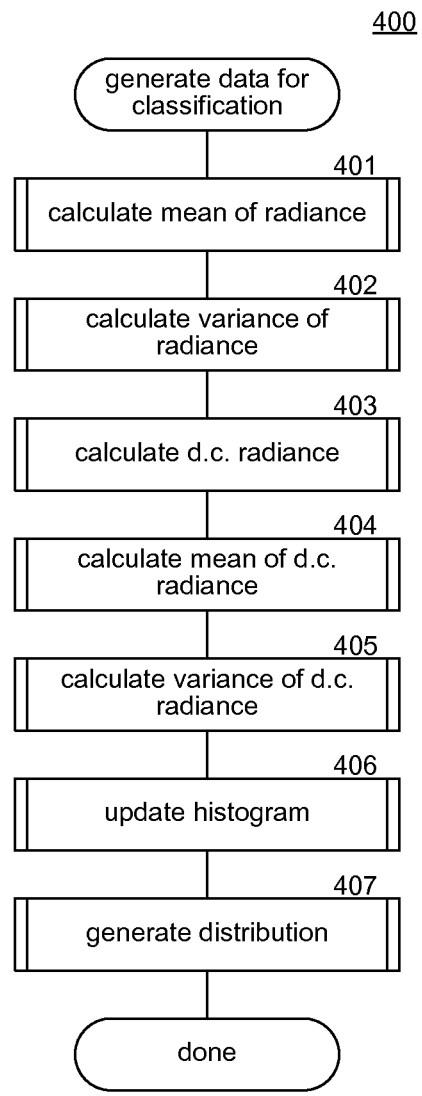
FIG. 4 is a flow diagram that illustrates the processing of a "generate data for classification" component of the detection system in some embodiments.

FIG. 4 is a flow diagram that illustrates the processing of a "generate data for classification" component of the detection system in some embodiments. The "generate data for classification" component 400 generates the classification data for a current image. In block 401, the component invokes the "calculate mean of radiance" component to calculate the mean for the current frame. In block 402, the component invokes the "calculate variance of radiance" component to calculate the variance for the current frame. In block 403, the component invokes the "calculate depth-compensated radiance" component to calculate the depth-compensated intensities for the current image according to equations 1.1 and 1.2. In block 404, the component invokes the "calculate mean of depth-compensated radiance" component to calculate the mean for the current depth-compensated image. In block 405, the component invokes the "calculate variance of depth-compensated radiance" component to calculate the variance for the current depth-compensated image. In block 406, the component invokes the "update histogram" component to update the histogram of intensities according to equation 1.5. In block 407, the component invokes the "generate distribution" component to generate a distribution of the intensities from the histogram. The component then completes.

Figure 5:
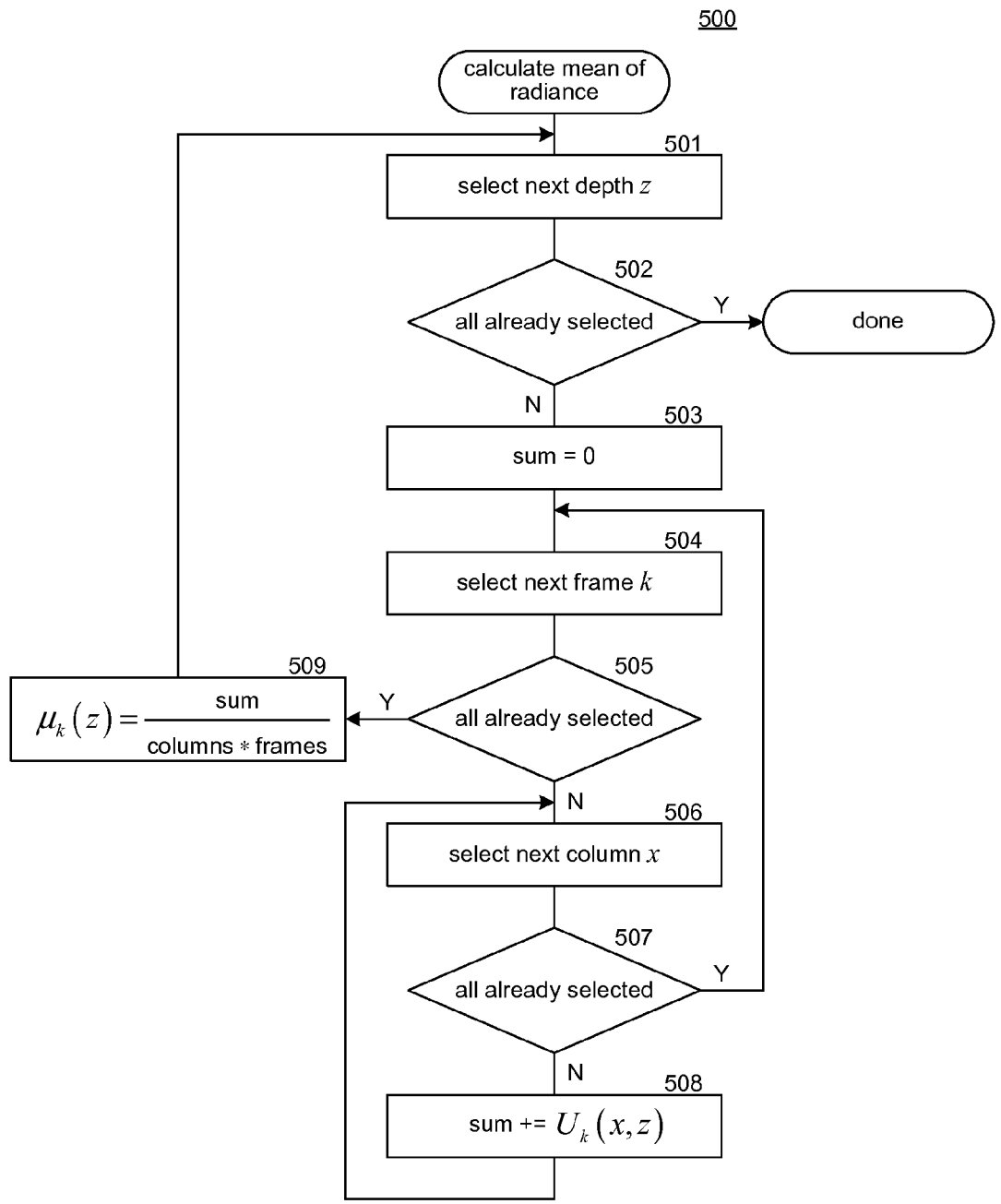
FIG. 5 is a flow diagram that illustrates the processing of a "calculate mean of radiance" component in some embodiments.

FIG. 5 is a flow diagram that illustrates the processing of a "calculate mean of radiance" component in some embodiments. The "calculate mean of radiance" component 500 recursively calculates the mean of the intensities at each depth for all images that have been processed. The detection system may maintain some information (e.g., a running total of the sum of the intensities) for each depth for use in calculating the means and variance for the current image without having to access previous frames. In block 501, the component selects the next depth. In decision block 502, if all the depths have already been selected, then the component completes, else the component continues at block 503. In block 503, the component initializes a sum of the intensities for the selected depth. In block 504, the component selects the next frame for the selected depth. In decision block 505, if all such frames have already been selected, then the component continues at block 509, else the component continues at block 506. In block 506, the component selects the next column of the selected frame. In decision block 507, if all such columns have already been selected, then the component loops to block 504 to select the next frame, else the component continues at block 508. In block 508, the component increments the sum of the intensities by the intensity within the selected frame at the selected depth and at the selected column and then loops to block 506 to select the next column. In block 509, the component sets the mean of the intensities for the selected depth to the sum of the intensities divided by the number of columns times the number of frames and then loops to block 501 to select the next step. In some embodiments, the "calculate mean of radiance" component recursively adapts means within a window of image frames in a streaming sequence (e.g., a certain number of frames prior to the current frame).

Figure 6:
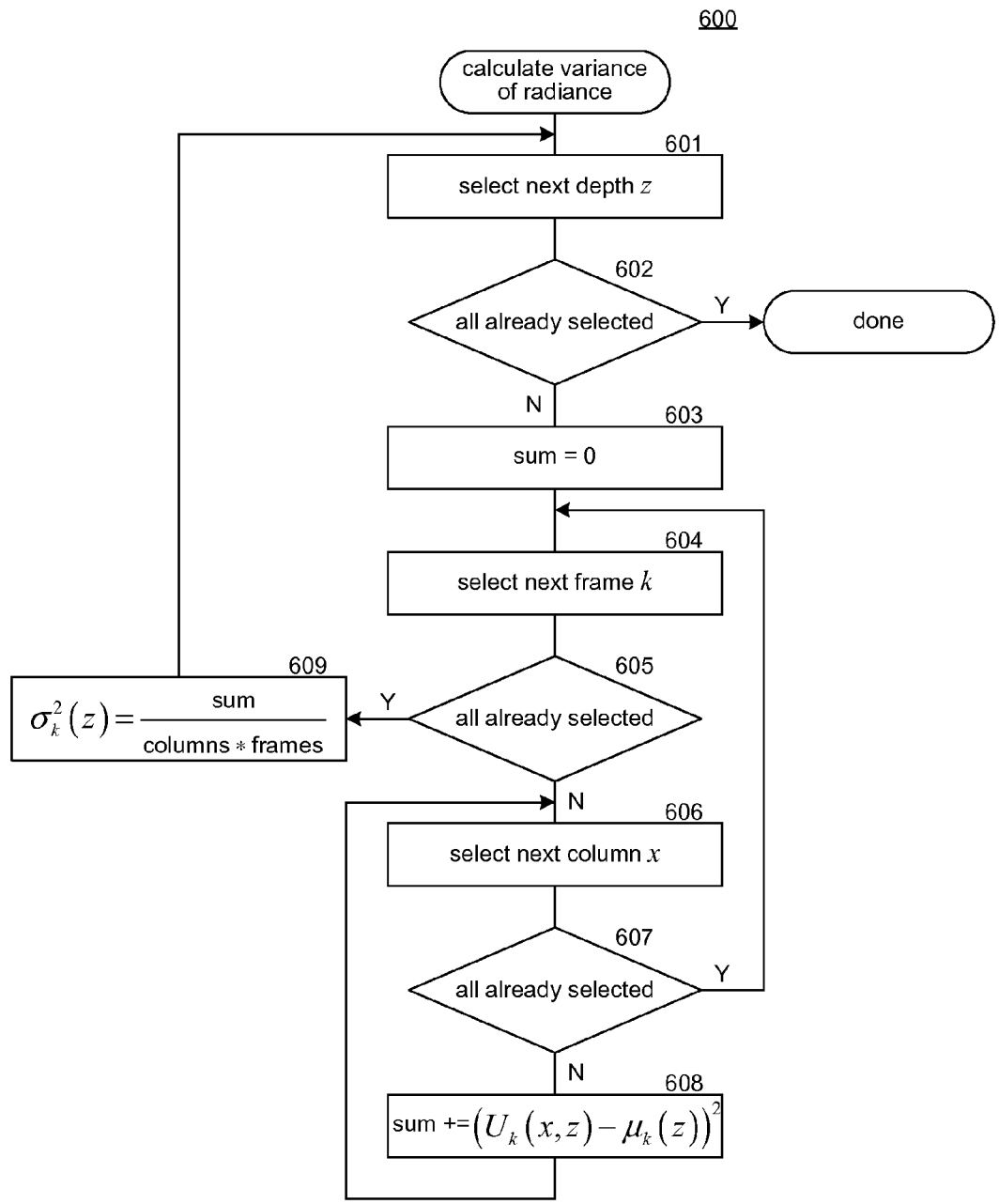
FIG. 6 is a flow diagram that illustrates the processing of a "calculate variance of radiance" component in some embodiments.

FIG. 6 is a flow diagram that illustrates the processing of a "calculate variance of radiance" component in some embodiments. The "calculate variance of radiance" component 600 calculates the variance of the intensities at each depth for all images that have been processed. In block 601, the component selects the next depth. In decision block 602, if all the depths have already been selected, then the component completes, else the component continues at block 603. In block 603, the component initializes a sum of the squares of the differences between each intensity and the mean of the intensities for the selected depth. In block 604, the component selects the next frame for the selected depth. In decision block 605, if all such frames have already been selected, then the component continues at block 609, else the component continues at block 606. In block 606, the component selects the next column of the selected frame. In decision block 607, if all such columns have already been selected, then the component loops to block 604 to select the next frame, else the component continues at block 608. In block 608, the component increments the sum by the square of the difference between the mean and the intensity within the selected frame at the selected depth and at the selected column and then loops to block 606 to select the next column. In block 609, the component sets the variance of the intensities for the selected depth to the sum divided by the number of columns times the number of frames and then loops to block 601 to select the next depth. In some embodiments, the "calculate variance of radiance" component recursively adapts variances within a window of image frames in a streaming sequence (e.g., a certain number of frames prior to the current frame).

Figure 7:
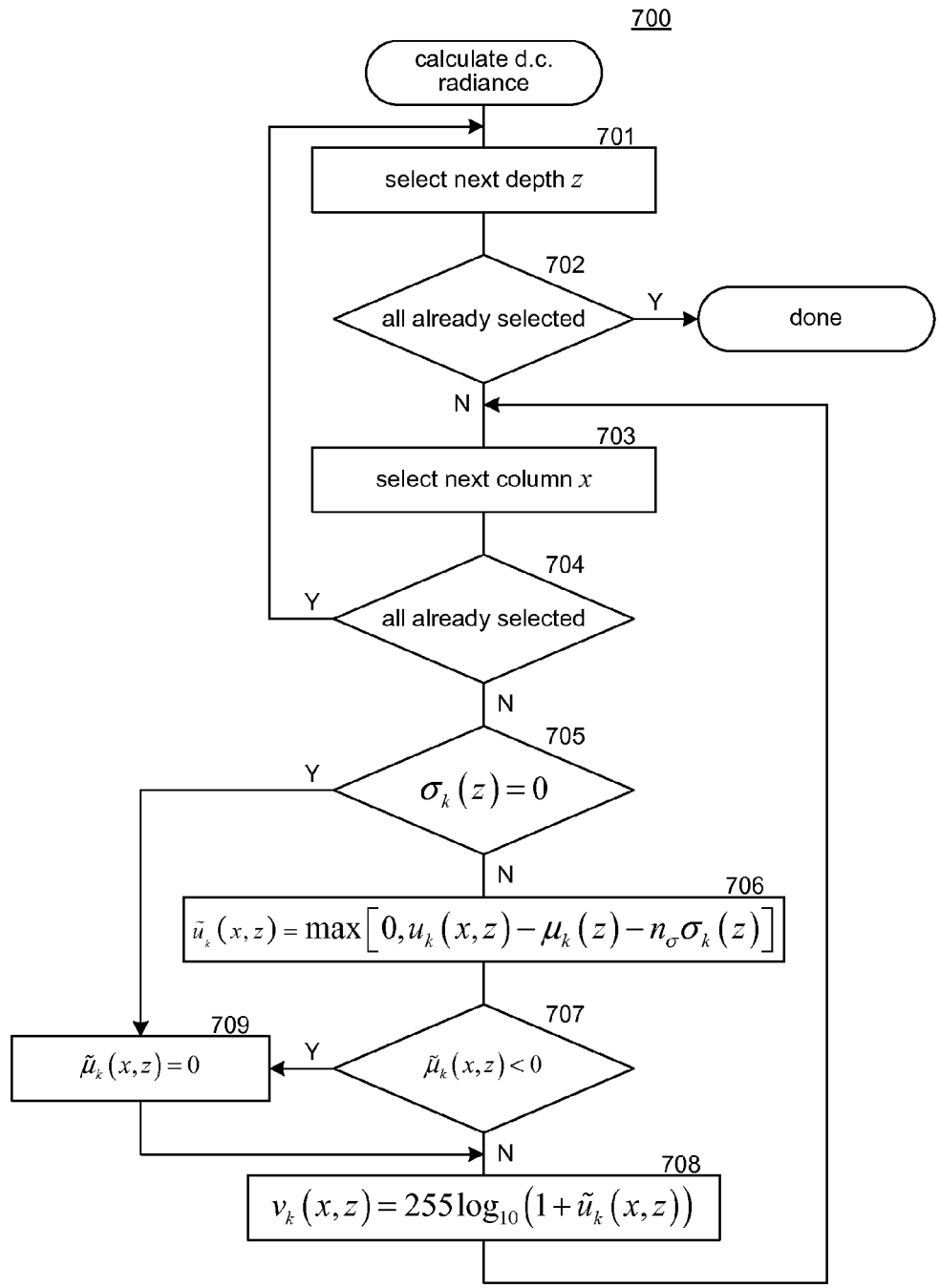
FIG. 7 is a flow diagram that illustrates the processing of a "calculate depth-compensated radiance" component in some embodiments.

FIG. 7 is a flow diagram that illustrates the processing of a "calculate depth-compensated radiance" component in some embodiments. The "calculate depth-compensated radiance" component 700 calculates the depth-compensated radiance for each image of the current frame. In block 701, the component selects the next depth. In decision block 702, if all the depths have already been selected, then the component completes, else the component continues at block 703. In block 703, the component selects the next column for the selected depth. In decision block 704, if all such columns have already been selected, then the component loops to block 701 to select the next depth, else the component continues at block 705. In decision block 705, if the standard deviation for the selected depth is equal to zero, then the component continues at block 709, else the component continues at block 706. In block 706, the component calculates the depth-compensated intensity as a number of standard deviations. In decision block 707, if the number of standard deviations is less than zero, then the component continues at block 709, else the component continues at block 708. In block 708, the component converts the number of standard deviations to an integer in the range of 0 to 255 and then loops to block 703 to select the next column. In block 709, the component sets the number of standard deviations to zero and continues at block 708.

Figure 8:
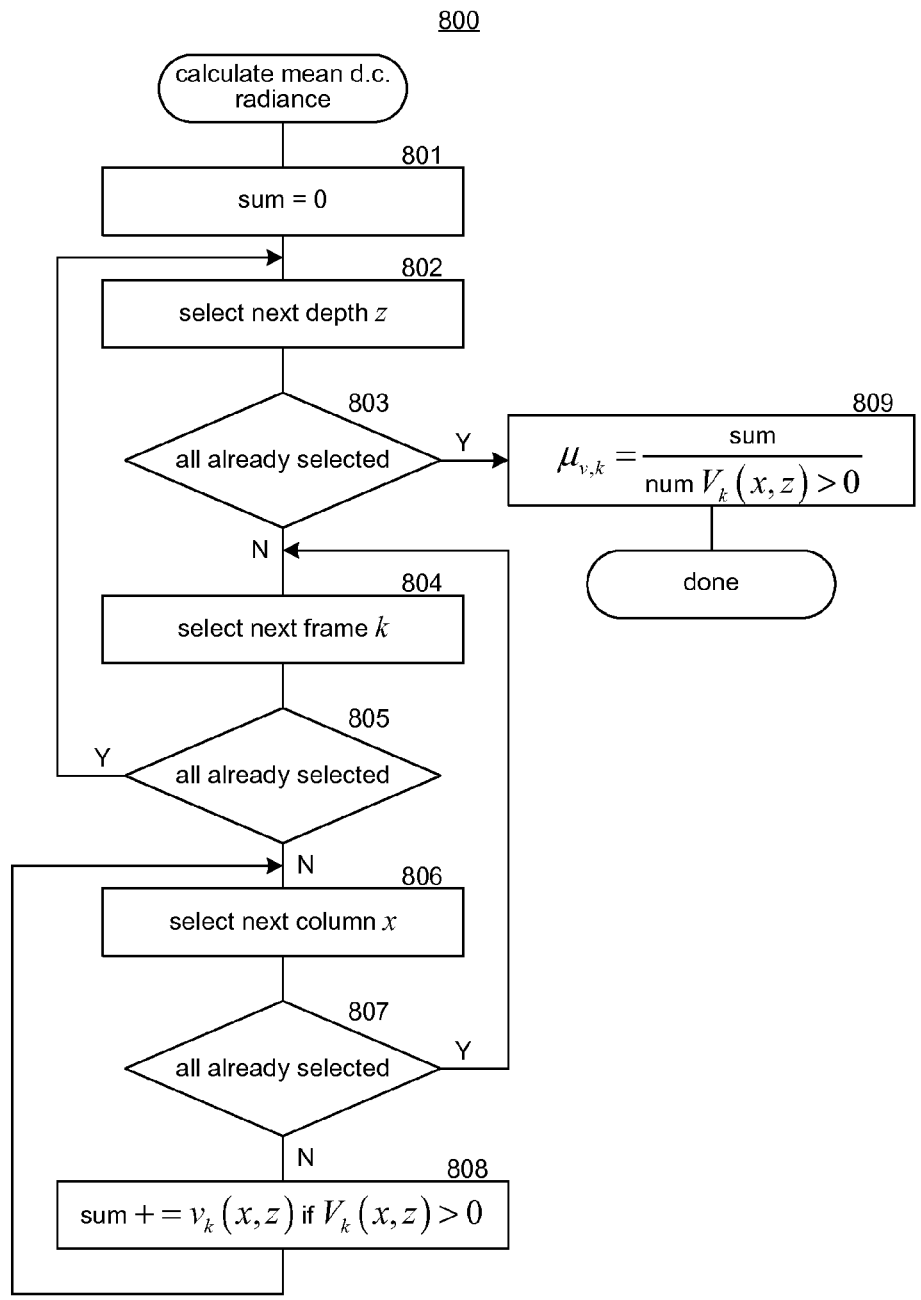
FIG. 8 is a flow diagram that illustrates the processing of a "calculate mean of depth-compensated radiance" component in some embodiments.

FIG. 8 is a flow diagram that illustrates the processing of a "calculate mean of depth-compensated radiance" component in some embodiments. The "calculate mean of depth-compensated radiance" component 800 calculates the mean of the depth-compensated intensities at each depth for all images that have been processed. In block 801, the component initializes a running sum of the depth-compensated intensities. In block 802, the component selects the next depth. In decision block 803, if all the depths have already been selected, then the component continues at block 809, else the component continues at block 804. In block 804, the component selects the next frame for the selected depth. In decision block 805, if all such frames have already been selected, then the component loops to block 802 to select the next depth, else the component continues at block 806. In block 806, the component selects the next column of the selected frame. In decision block 807, if all such columns have already been selected, then the component loops to block 804 to select the next frame, else the component continues at block 808. In block 808, if the depth-compensated intensity is non-zero, the component increments the sum by the depth-compensated intensity within the selected frame at the selected depth and at the selected column and then loops to block 806 to select the next column. In block 809, the component sets the mean of the non-zero, depth-compensated intensities for the selected depth to the sum divided by the number of non-zero intensities that contributed to the sum, and then completes.

Figure 9:
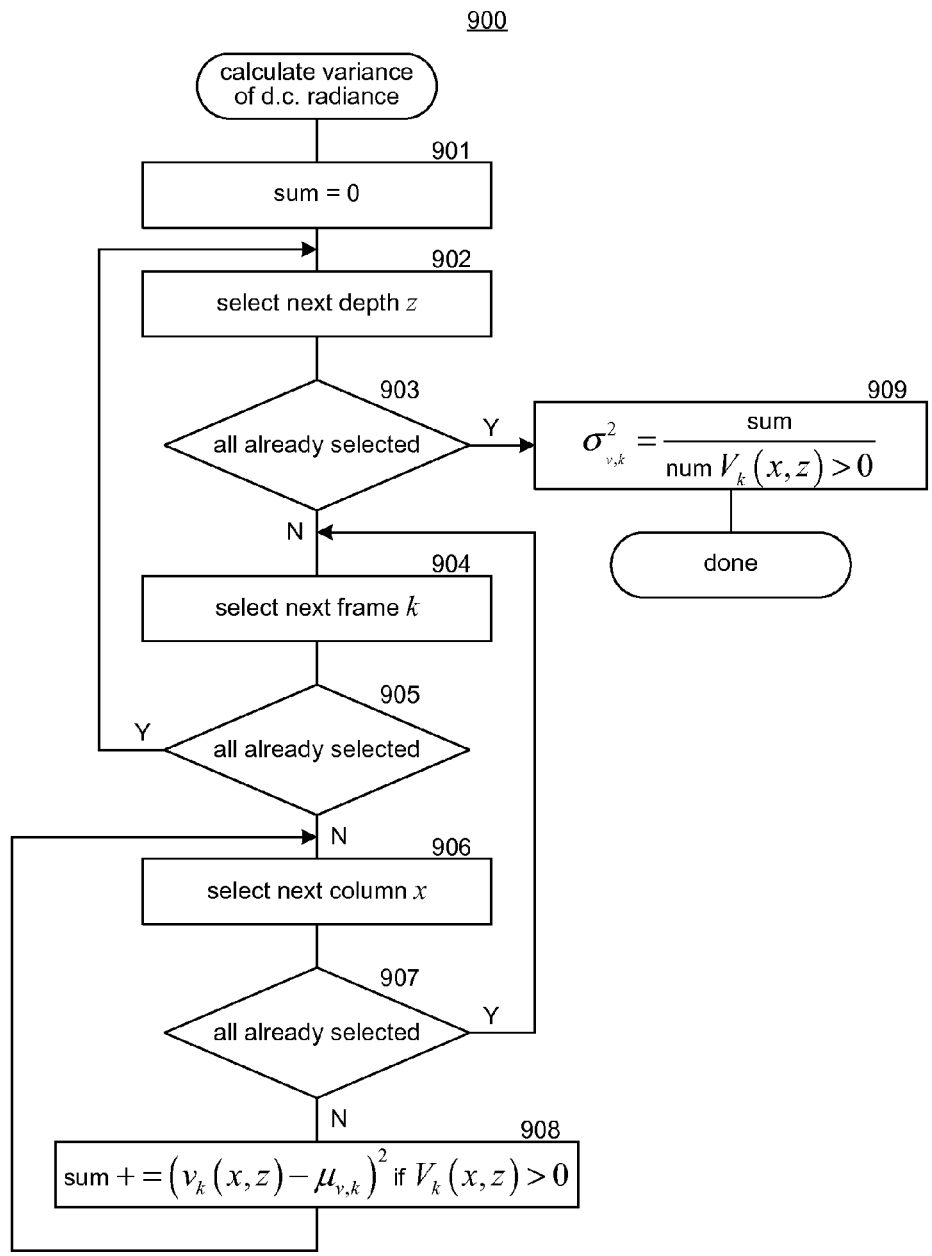
FIG. 9 is a flow diagram that illustrates the processing of a "calculate variance of depth-compensated radiance" component in some embodiments.

FIG. 9 is a flow diagram that illustrates the processing of a "calculate variance of depth-compensated radiance" component in some embodiments. The "calculate variance of depth-compensated radiance" component 900 calculates the variance of the depth-compensated intensities at each depth for all images that have been processed. In block 901, the component initializes a sum of the squares of the differences between each of the depth-compensated intensities and the mean of the intensities for the selected depth. In block 902, the component selects the next depth. In decision block 903, if all the depths have already been selected, then the component continues at block 909, else the component continues at block 904. In block 904, the component selects the next frame for the selected depth. In decision block 905, if all such frames have already been selected, then the component loops to block 902 to select the next depth, else the component continues at block 906. In block 906, the component selects the next column of the selected frame. In decision block 907, if all such columns have already been selected, then the component loops to block 904 to select the next frame, else the component continues at block 908. In block 908, if the depth-compensated intensity is non-zero, the component increments the sum by the square of the difference between the mean and the depth-compensated intensity within the selected frame at the selected depth and at the selected column and then loops to block 906 to select the next column. In block 909, the component sets the variance of the non-zero, depth-compensated intensities for the selected depth to the sum divided by the number of non-zero intensities that contributed to the sum, and then completes.

Figure 10:
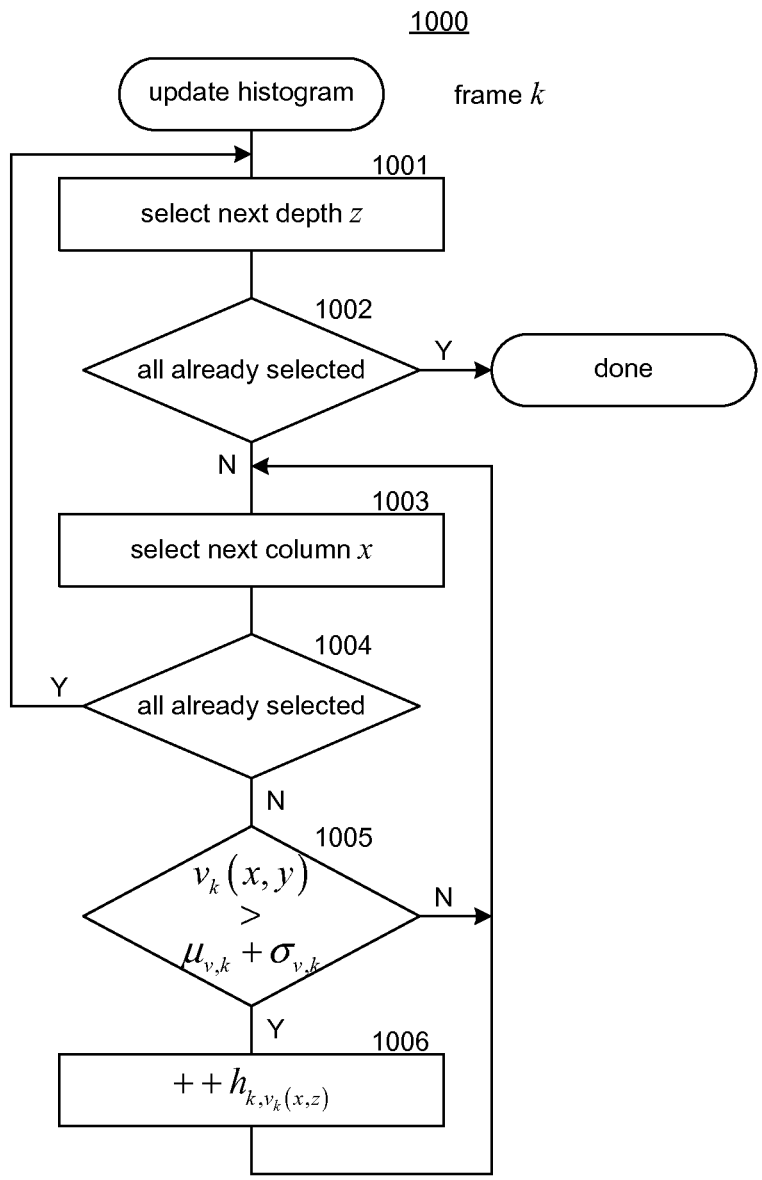
FIG. 10 is a flow diagram that illustrates the processing of an "update histogram" component in some embodiments.

FIG. 10 is a flow diagram that illustrates the processing of an "update histogram" component in some embodiments. The "update histogram" component 1000 updates a histogram of the count of intensities for each integer value of a depth-compensated intensity. In block 1001, the component selects the next depth. In decision block 1002, if all the depths have already been selected, then the component completes, else the component continues at block 1003. In block 1003, the component selects the next column. In decision block 1004, if all the columns have already been selected, then the component loops to block 1001 to select the next depth, else the component continues at block 1005. In block 1005, if the intensity at the selected depth for the selected column of the current frame is statistically significant as indicated by equation 1.4a, then the component continues at block 1006, else the component loops to block 1003 to select the next column. In block 1006, the component increments the histogram count for the depth-compensated intensity at the selected depth and selected column of the current frame and then loops to block 1003 to select the next column.

Figure 11:
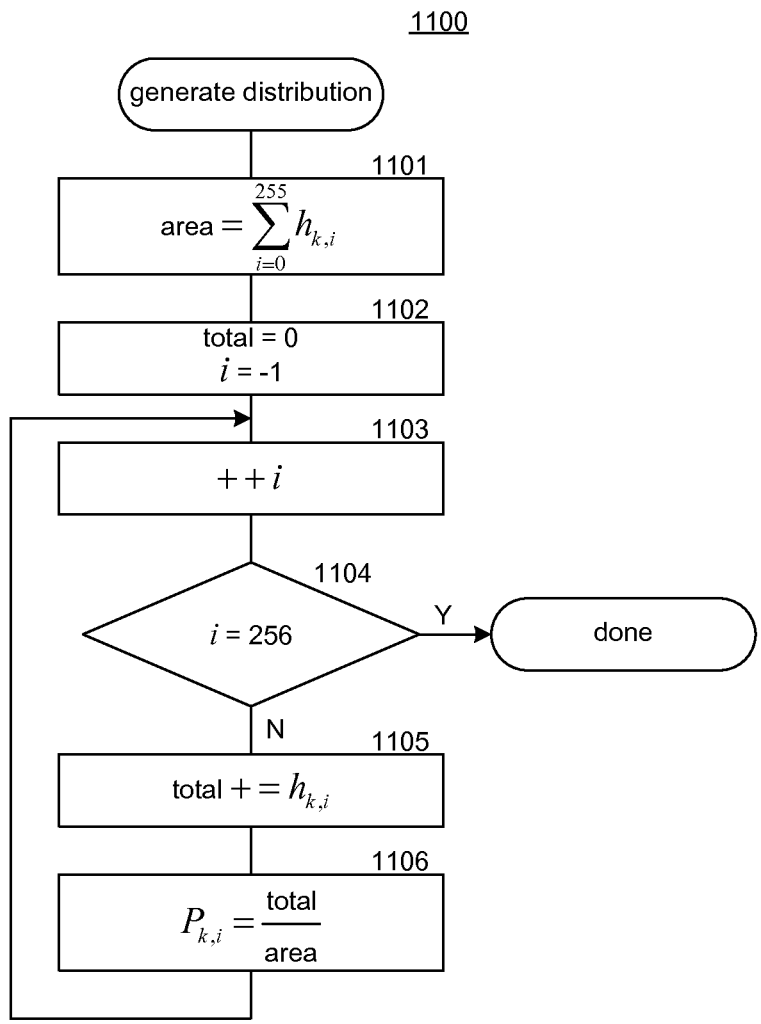
FIG. 11 is a block diagram that illustrates the processing of a "generate distribution" component in some embodiments.

FIG. 11 is a block diagram that illustrates the processing of a "generate distribution" component in some embodiments. The "generate distribution" component 1100 generates a probability distribution that indicates the probability of each integer value of a depth-compensated intensity being at or below that integer value. The component may alternatively generate a distribution that is simply a count of the voxels that have a depth-compensated intensity that is at or below that integer value. In block 1101, the component sets the area of the histogram to the sum of the counts of the histogram. In block 1102, the component initializes a running total of the counts and an integer value. In block 1103, the component increments the integer value. In decision block 1104, if the integer value is greater than the maximum integer of the depth-compensated intensity, then the component completes, else the component continues at block 1105. In block 1105, the component increments the total by the count for the current integer value. In block 1106, the component sets a probability for the current integer value to the total divided by the area and loops to block 1103 to increment the next integer value.

Figure 12:
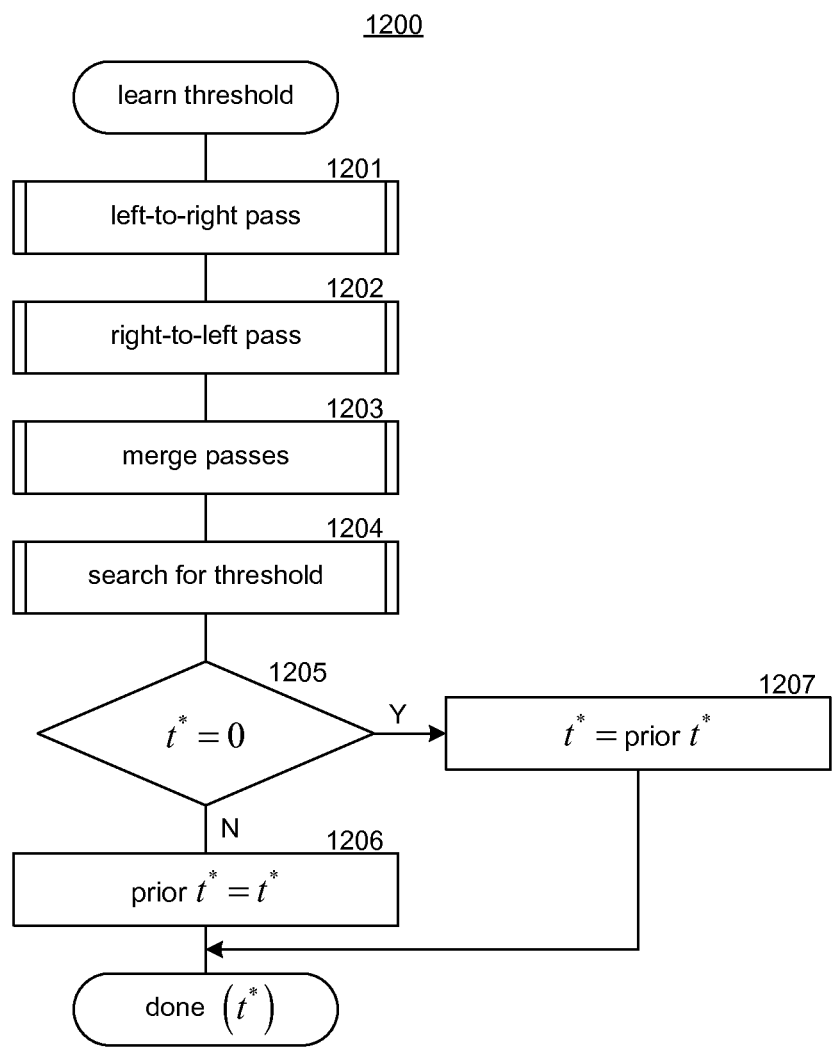
FIG. 12 is a flow diagram that illustrates the processing of a "learn threshold" component in some embodiments.

FIG. 12 is a flow diagram that illustrates the processing of a "learn threshold" component in some embodiments. The "learn threshold" component 1200 finds a probability threshold for classifying depth-compensated intensities. In block 1201, the component invokes the left-to-right pass component. In block 1202, the component invokes the right-to-left pass component. In block 1203, the component invokes the merge passes component. In block 1204, the component invokes the search for threshold component. In decision block 1205, if a threshold was not identified, then the component continues at block 1207, else the component continues at block 1206. In block 1206, the component sets the prior threshold (initialized to zero prior to image frame streaming) to the current threshold, and then completes. In block 1207, the component sets the threshold to the prior threshold and completes.

Figure 13:
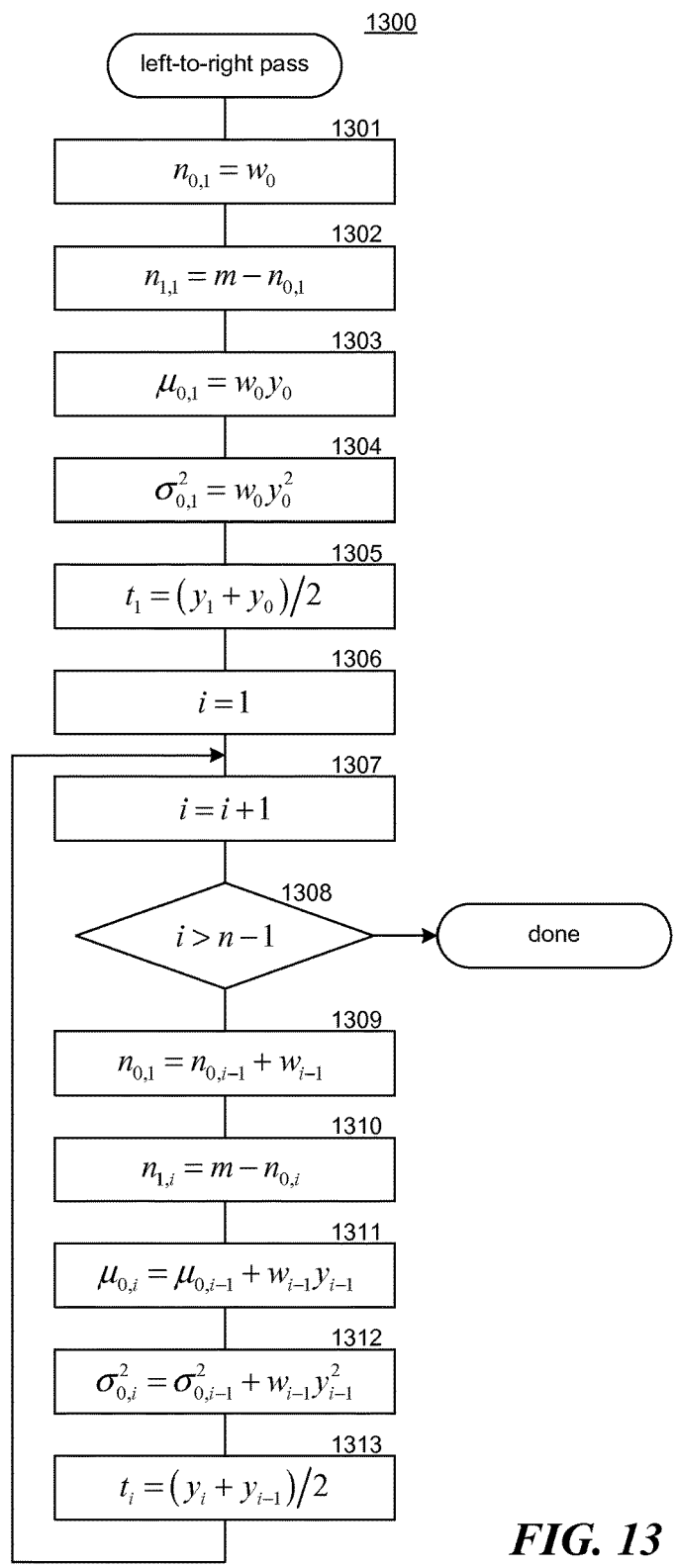
FIG. 13 is a flow diagram that illustrates the processing of a "left-to-right pass" component in some embodiments.

FIG. 13 is a flow diagram that illustrates the processing of a "left-to-right pass" component in some embodiments. The "left-to-right pass" component 1300 calculates various values for use in generating statistics associated with a class that is below the threshold for each possible threshold as described in Section 4.2. In blocks 1301-1305, the component initializes variables for this pass. In block 1306, the component initializes a current index. In blocks 1307-1313, the component loops calculating the various values assuming the threshold is at the current index. In block 1307, the component increments the current index. In decision block 1308, if the current index is greater than the number of distinct values in the distribution, then the component completes, else the component continues at block 1309. In blocks 1309-1313, the component calculates the various values for the current index and then loops to block 1307 to increment the current index.

Figure 14:
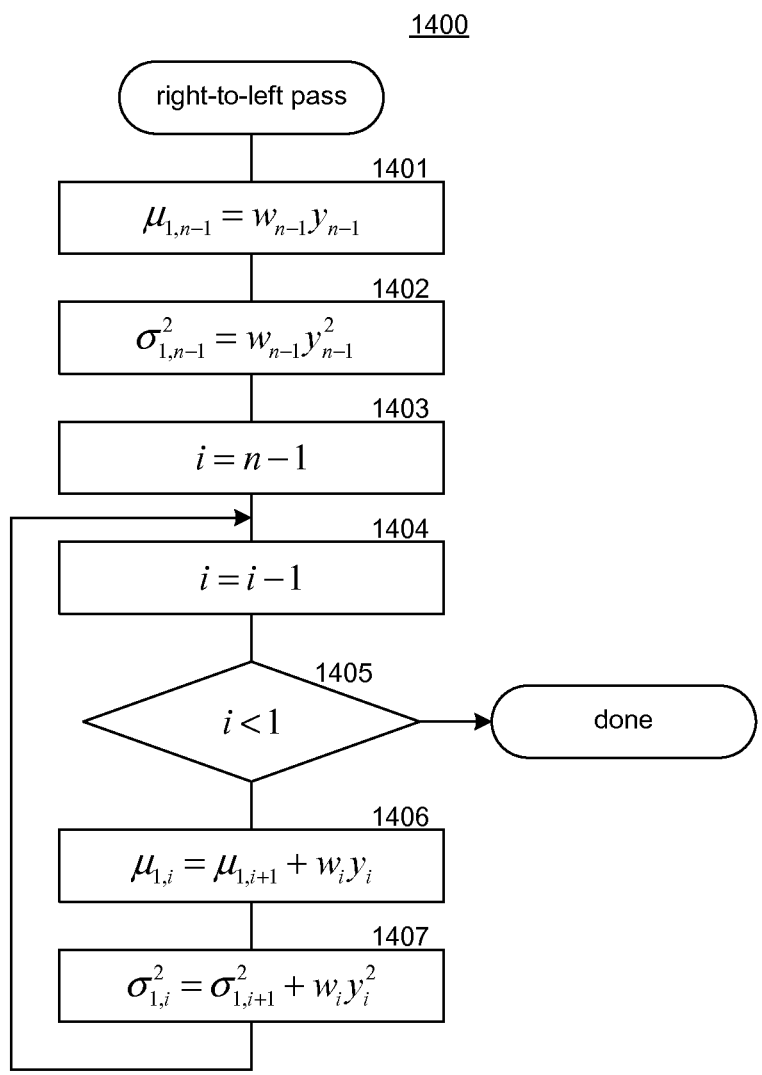
FIG. 14 is a flow diagram that illustrates the processing of a "right-to-left pass" component in some embodiments.

FIG. 14 is a flow diagram that illustrates the processing of a "right-to-left pass" component in some embodiments. The "right-to-left pass" component 1400 calculates various values for use in generating statistics associated with a class that is above the threshold for each possible threshold as described in Section 4.2. In blocks 1401-1402, the component initializes variables for this pass. In block 1403, the component initializes a current index. In blocks 1404-1407, the component loops calculating the various values assuming the threshold is at the current index. In block 1404, the component decrements the current index. In decision block 1405, if the current integer value is less than one, then the component completes, else the component continues at block 1406. In blocks 1406-1407, the component calculates the various values for the current index and then loops to block 1304 to decrement the current index.

Figure 15:
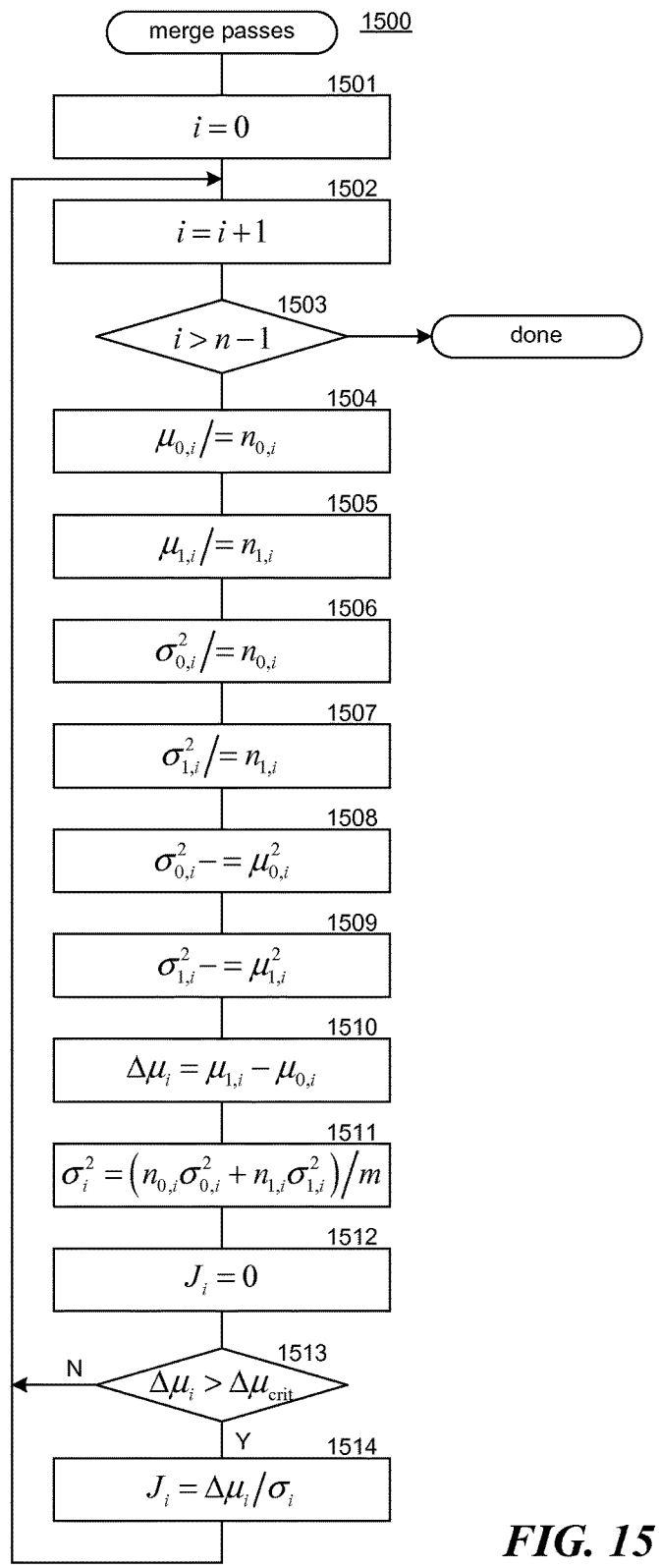
FIG. 15 is a flow diagram that illustrates the processing of a "merge passes" component in some embodiments.

FIG. 15 is a flow diagram that illustrates the processing of a "merge passes" component in some embodiments. The "merge passes" component 1500 is invoked to merge results of the left-to-right pass with results of the right-to-left pass in accordance with Section 4.2. In block 1501, the component initializes the current index. In blocks 1502-1514, the component loops merging the results of the passes. In block 1502, the component increments the current index. In decision block 1503, if the current index is larger than the number of distinct values in the distribution, then the component completes, else the component continues at block 1504. In block 1504-1514, the component merges the results to generate the statistics for each class, assuming the threshold is at the current index. The component then loops to block 1502 to increment the current index.

Figure 16:
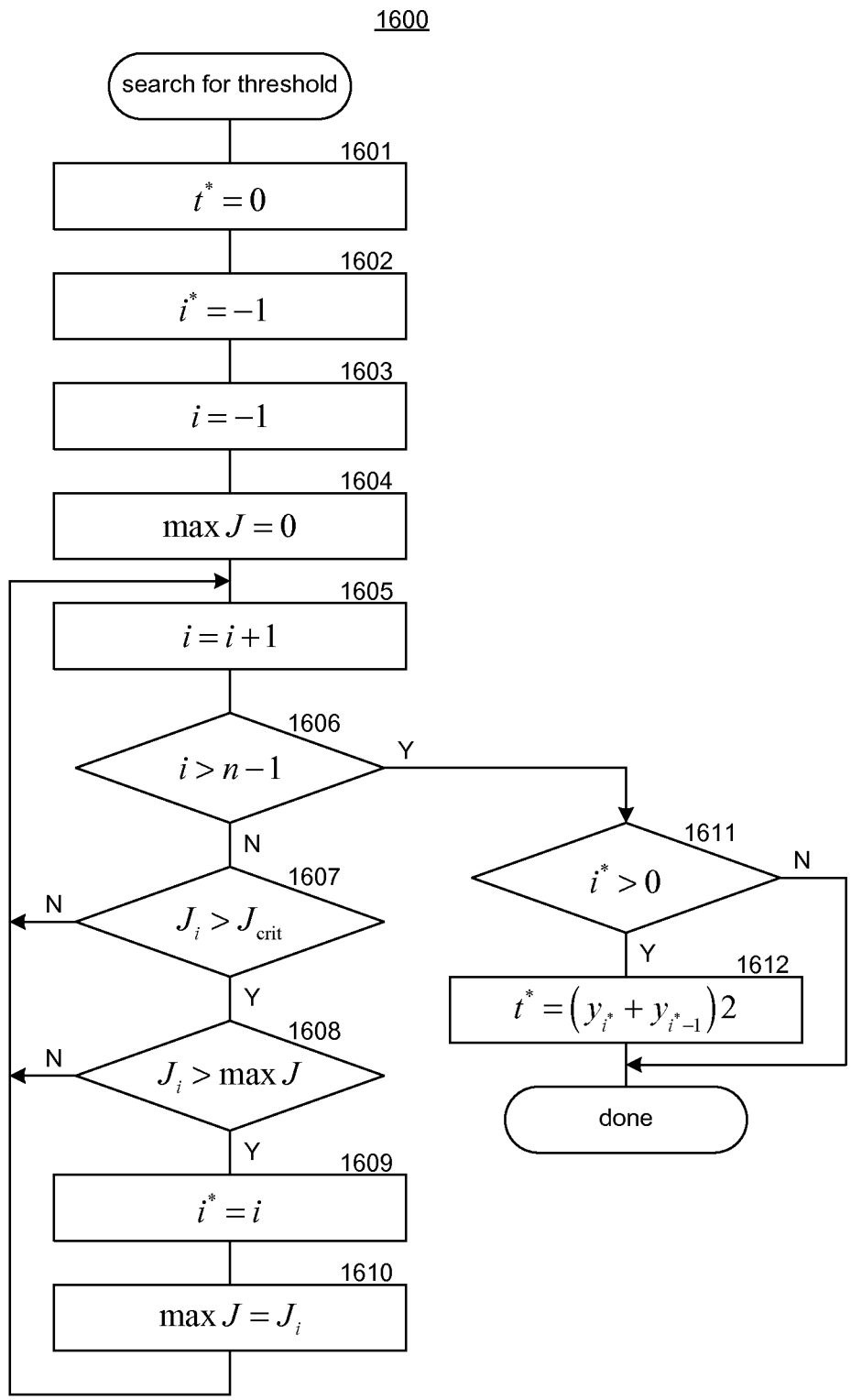
FIG. 16 is a flow diagram that illustrates the processing of a "search for threshold" component in some embodiments.

FIG. 16 is a flow diagram that illustrates the processing of a "search for threshold" component in some embodiments. The "search for threshold" component 1600 is invoked after the statistics for the classes assuming each possible threshold have been generated. The component searches for the threshold that maximizes the objective function. In block 1601, the component initializes the threshold. In block 1602, the component initializes an index for the threshold. In block 1603, the component initializes a current index. In block 1604, the component initializes the maximum value of the objective function. In blocks 1605-1610, the component loops calculating the value of the objective function for the current index and recording the index that has the maximum value of the objective function. In block 1605, the component increments the current index. In decision block 1606, if all the distinct values have already been selected, then the component continues at block 1611, else the component continues at block 1607. In decision block 1607, if the value of the objective function is greater than a minimum value, then the component continues at block 1608, else the component loops to block 1605 to increment the current index. In decision block 1608, if the value of the objective function is greater than the maximum value encountered so far, then the component continues at block 1609, else the component loops to block 1605 to increment the current index. In block 1609, the component records a current index as the index of the maximum value of the objective function. In block 1610, the component sets the maximum value to the current value of the objective function and then loops to block 1605 to increment the current index. In decision block 1611, if a maximum value of an objective function has been identified, then the component continues at block 1612, else the component completes. In block 1612, the component sets the threshold to the average of the distinct values for the index with the maximum value of the objective function and the index that is one less and then completes.

Figure 17:
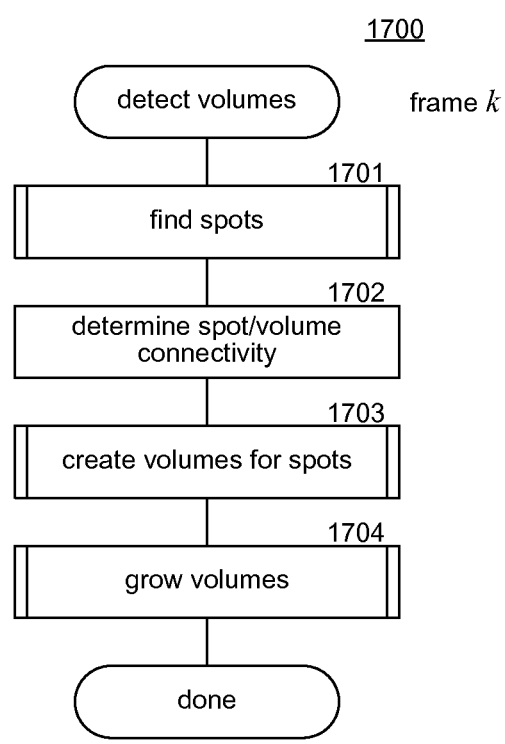
FIG. 17 is a flow diagram that illustrates the processing of an "detect volumes" component in some embodiments.

FIG. 17 is a flow diagram that illustrates the processing of a "detect volumes" component in some embodiments. The "detect volumes" component 1700 processes a current frame to create new volumes, grow existing volumes, and terminate existing volumes. In block 1701, the component invokes an identify spots component to identify the spots within the current frame. In block 1702, the component invokes an identify spot/volume connectivity component to identify connections between volumes and spots. In block 1703, the component invokes a create volumes for spots component to create volumes for spots that are not connected to any other spot. In block 1704, the component invokes the grow volumes component to grow existing volumes and then completes.

Figure 18:
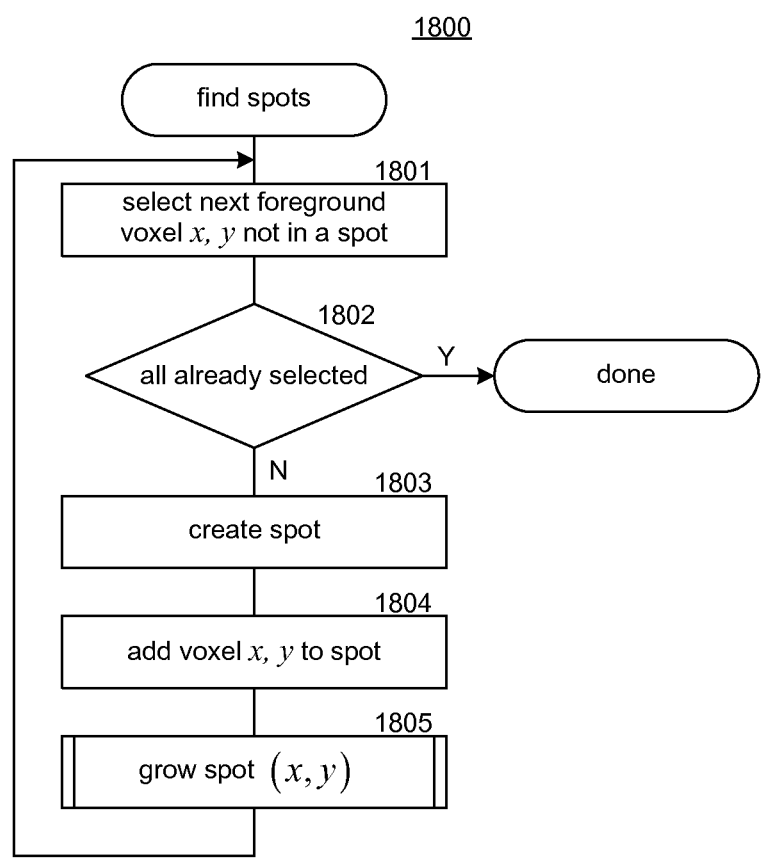
FIG. 18 is a flow diagram that illustrates the processing of a "find spots" component in some embodiments.

FIG. 18 is a flow diagram that illustrates the processing of a "find spots" component in some embodiments. The "find spots" component 1800 is invoked to find spots within a current frame (such as a GPR image frame that lies in a vertical plane normal to the along-track direction). In block 1801, the component selects the next foreground voxel that is not already part of a spot. In decision block 1802, if all such foreground voxels have already been selected, then the component completes, else the component continues at block 1803. In block 1803, the component seeds a spot with the selected foreground voxel. In block 1804, the component adds the foreground voxel to the spot. In block 1805, the component invokes a "grow spot" component to grow the spot from the seed voxel and then loops to block 1801 to select the next foreground voxel that has not already been assigned to a spot.

Figure 19:
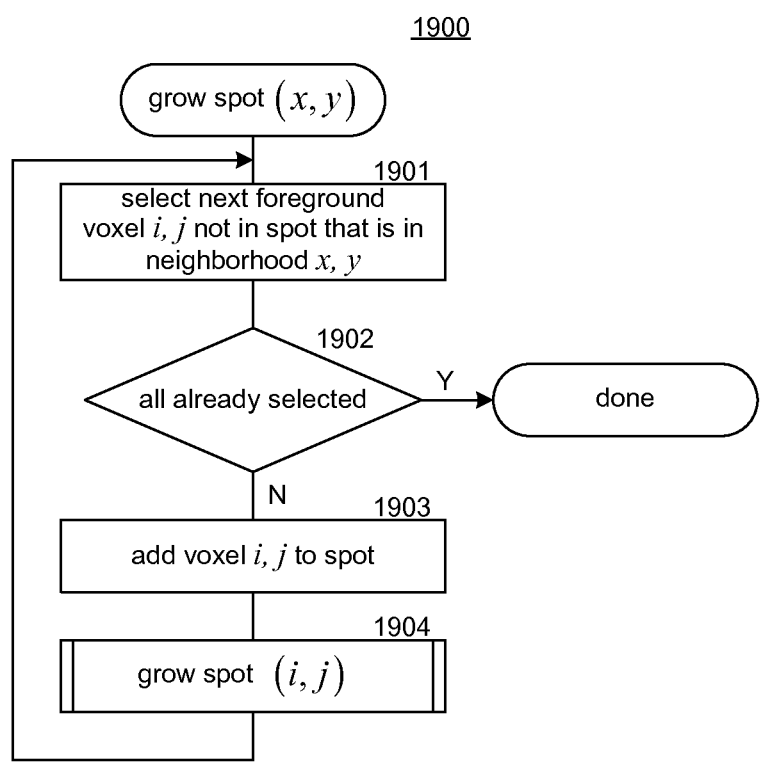
FIG. 19 is a flow diagram that illustrates the processing of a "grow spot" component in some embodiments.

FIG. 19 is a flow diagram that illustrates the processing of a "grow spot" component in some embodiments. The "grow spot" component 1900 is invoked to grow a spot that includes a passed voxel. In block 1901, the component selects the next foreground voxel that is not in a spot that is in the neighborhood of the passed spot. In decision block 1902, if all such foreground voxels have already been selected, then the component returns, else the component continues at block 1903. In block 1903, the component adds the selected voxel to the spot. In block 1904, the component recursively invokes the grow spot component, passing the selected spot, and then loops to block 1901 to select the next foreground voxel not in a spot that is in the neighborhood of the passed foreground voxel.

Figure 20:
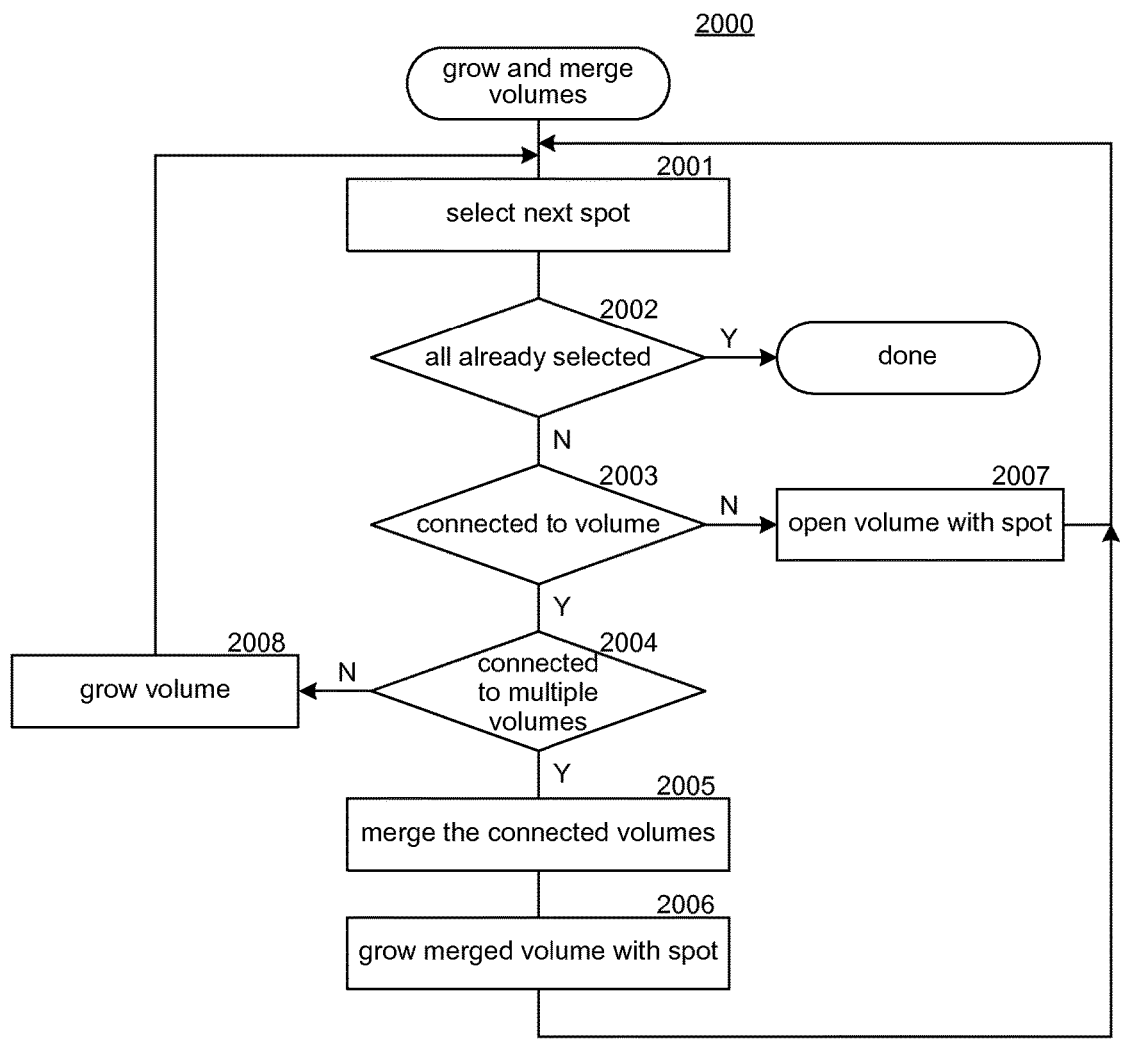
FIG. 20 is a flow diagram that illustrates the processing of a "grow and merge volumes" component in some embodiments.

FIG. 20 is a flow diagram that illustrates the processing of a "grow and merge volumes" component in some embodiments. The "grow and merge volumes" component 2000 is invoked to open (create) volumes for spots that are not connected to other volumes, to grow volumes with spots that are connected to only one volume, and to merge multiple volumes that are connected to the same spot in the current image frame. In block 2001, the component selects the next spot of the current frame. In decision block 2002, if all the spots have already been selected, then the component completes, else the component continues at block 2003. In decision block 2003, if the spot is connected to a volume, then the component continues at block 2004, else the component continues at block 2007 to open a new volume with the spot and loops back to block 2001 to select the next block for the current frame. In decision block 2004, if the spot is connected to multiple volumes, then the component continues at block 2005 to merge the connected volumes and then to block 2006 to add the spot to the newly merged volume, else the component continues to block 2008 to add the spot to the volume and loops to block 2001 to select the next spot for the current frame.

Figure 21:
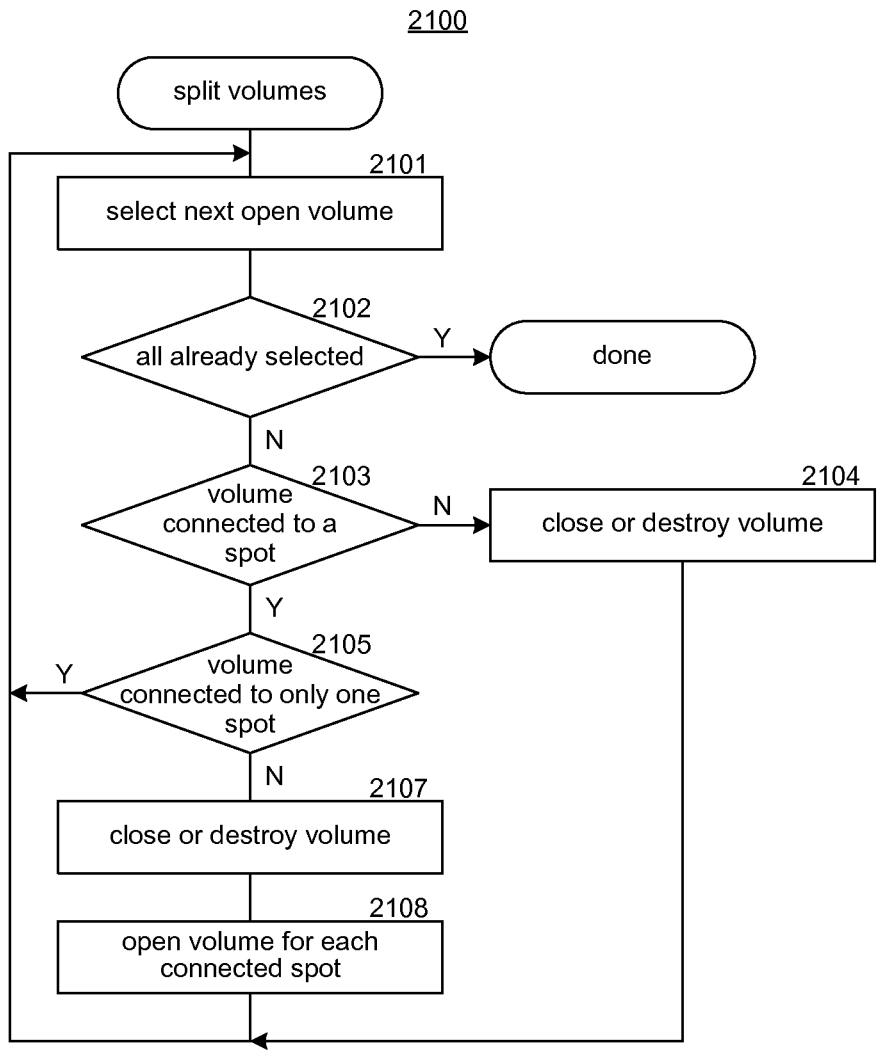
FIG. 21 is a flow diagram that illustrates the processing of a "split volumes" component in some embodiments.

FIG. 21 is a flow diagram that illustrates the processing of a "split volumes" component in some embodiments. The "split volumes" component 2100 is invoked to split volumes that are connected to multiple spots. In block 2101, the component selects the next open volume. In decision block 2102, if all the open volumes have already been selected, then the component completes, else the component continues at block 2103. In decision block 2103, if the selected volume is connected to a spot, then the component continues at block 2105, else the component continues at block 2104. In block 2104, the component closes or destroys the selected volume and loops to block 2101 to select the next open volume. In decision block 2105, if the selected volume is connected to only one spot, then the component loops to block 2101 to select the next open volume, else the component continues at block 2107-2108 to split the volume. In block 2107, the component closes or destroys the selected volume. In block 2108, the component opens a volume for each connected spot and then loops to block 2101 to select the next open volume.

The following sections provide support for various claims.

Depth and Along-Medium Compensation for Image Voxel Intensities

1. A method performed by a computing system for generating depth-compensated intensities for voxels in a target image frame of a medium, the target image frame having intensities of voxels with a depth and a cross-medium location, the method comprising:
for each of a plurality of depths, generating statistics from the intensities at that depth; and
for each intensity of the target image frame, calculating a depth-compensated intensity that is relative to the statistics for the depth of that intensity so that the intensities are normalized across depths to account for variations resulting from differences in depth.

2. The method of sub-section 1 wherein the statistics for a depth include a mean and a variance for the intensities at that depth.

3. The method of sub-section 2 wherein a depth-compensated intensity is based on a number of standard deviations above a statistically significant intensity.

4. The method of sub-section 3 wherein the statistically significant intensity is based on one or more standard deviations above the mean.

5. The method of sub-section 4 further comprising mapping the depth-compensated intensities to integers on a decibel scale clipped to some maximum value.

6. The method of sub-section 1 wherein the target image frame is an image frame within a streaming sequence of image frames and the statistics for a depth are based on intensities at that depth in image frames that precede the target image frame.

7. The method of sub-section 6 wherein the statistics for a depth are based only on a certain number of image frames prior to the target image frame so that the statistics can adjust more quickly to changes in one or more properties of the medium.

8. The method of sub-section 6 wherein the statistics for a depth include a mean and a variance for the intensities at that depth.

9. The method of sub-section 8 wherein a depth-compensated intensity for a voxel is based on a number of standard deviations above a statistically significant intensity for intensities at that depth.

10. The method of sub-section 1 wherein the variations resulting from differences in depth are based in part on strength of a signal passing through the medium and its return signal at each depth.

11. A system for generating a depth-compensated intensity for detection of a characteristic of the medium, the system comprising:
a storage medium storing computer-executable instructions that:
access a sequence of image frames of the medium, each image frame corresponding to an along-medium location and having voxels representing intensities at various depths and cross-medium locations at that along-medium location;
for various depths, generate statistics from the intensities of the voxels at that depth in the sequence of image frames, the statistics based on mean and standard deviation of the intensities; and
for voxels of a current image frame, calculate a depth-compensated intensity for a voxel based on a number of standard deviations that the intensity of the voxel is above a statistically significant intensity for the depth of the voxel; and
a processor executing the computer-executable instructions stored in the storage medium.

12. The system of sub-section 11 wherein the statistically significant intensity is based on one or more standard deviations above the mean.

13. The system of sub-section 12 wherein the storage medium further comprises computer-executable instructions that map the depth-compensated intensities to integers on a decibel scale clipped to some maximum value.

14. The system of sub-section 11 wherein the statistics for a depth are based only on a certain number of image frames before the current image frame so that the statistics can adjust more quickly to changes in one or more properties of the medium.

15. The system sub-section 11 wherein the sequence of image frames is generated from return signals from electromagnetic, sound, or seismic waves.

16. The system of sub-section 11 wherein a characteristic is an object within the medium.

17. The system of sub-section 11 wherein the intensity is a level of radiance.

18. A computer-readable storage medium storing computer-executable instructions for transforming intensities for voxels of a current image frame into depth-compensated intensities, the computer-executable instruction comprising instructions that:
access a sequence of image frames of the medium, each image frame corresponding to an along-medium location and having voxels representing intensities at various depths and cross-medium locations at that along-medium location;
for each depth, generate statistics from the intensities of the voxels at that depth in the sequence of image frames, the statistics including mean and standard deviation of the intensities; and
for each voxel of a current image frame, calculate a depth-compensated intensity for the voxel based on a number of standard deviations that the intensity of the voxel is above a significant intensity for the depth of the voxel.

19. The computer-readable storage medium of sub-section 18 wherein the statistically significant intensity is based on one or more standard deviations above the mean.

20. The computer-readable storage medium of sub-section 18 wherein the computer-executable instructions further comprise instructions that analyze the depth-compensated intensities to detect the presence of an object within the medium.

Unsupervised Binary Classifier for Discrete Probability Distributions of Prior Data 1. A method performed by a computing system for a classifier that classifies data representing a physical characteristic into two classes, the method comprising:
generating a discrete probability distribution of values of prior data;
providing a specification of between-class separation;
providing a specification of within-class concentration;
identifying a threshold value within the discrete probability distribution of the values of the prior data based on a combination of the between-class separation and within-class concentration; and designating the threshold value for classifying current data into the two classes.

2. The method of sub-section 1 wherein the discrete probability distribution is generated from a sequence of image frames of a medium, each image frame corresponding to an along-medium location and having voxels with values representing intensities at various depths and cross-medium locations at that along-medium location.

3. The method of sub-section 2 wherein the intensities are depth-compensated intensities.

4. The method of sub-section 2 further comprising applying the classifier to classify a voxel of a current image frame as being part of or not part of an object within the medium.

5. The method of sub-section 2 wherein the values are integers within some range and the discrete probability distribution is based on a histogram representing the number of occurrences of each integer value in the data.

6. The method of sub-section 1 wherein the specification of the between-class separation is based on a difference between a mean of the values within the classes.

7. The method of sub-section 1 wherein the specification of the within-class concentration is based on a weighted combination of variances of the values in each of the classes.

8. The method of sub-section 1 wherein the combination of the between-class separation and within-class concentration is a ratio of a difference between a mean of the values within the classes to a standard deviation derived from a population weighted combination of variances of the values within each of the classes.

9. The method of sub-section 1 wherein the identifying of the threshold value includes:
   calculating statistics for deriving the between-class separation and within-class concentration based on a pass through discrete values of the discrete probability distribution in ascending order and a pass through discrete values of the discrete probability distribution in descending order; and
   merging the statistics of the passes.

10. The method of sub-section 9 wherein calculation of the statistics for each pass further comprises, for each possible threshold value:
    calculating the mean of values, weighted by number of occurrences of each value in the data, to one side of the possible threshold value; and
    calculating the variance of values, weighted by number of occurrences of each value in the data, to one side of the possible threshold value.

11. The method of sub-section 10 wherein at least one of the passes further includes, for each possible threshold value, calculating the sum of values, weighted by number of occurrences of each value in the data, to one side of the possible threshold value.

12. The method of sub-section 11 wherein the data represents radiance derived from return signals resulting from ground-penetrating radar.

13. The method of sub-section 1 wherein the data represents radiance derived from return signals resulting from ground-penetrating radar.

14. The method of sub-section 1 further comprising applying the classifier to classify values of the current data that are below the threshold value into one class and values of the current data that are above the threshold value into the other class.

15. A computing system for classifying voxels of image frames of a medium based on whether or not the voxels represents a characteristic of the medium, the computing system comprising:
    a computer-readable storage medium storing computer-executable instructions for controlling the computing system to:
       access prior data that includes a sequence of image frames of the medium, each image frame corresponding to an along-medium location and having voxels with values representing intensities at various depths and cross-medium locations at that along-medium location;
       generate a discrete probability distribution of values of the prior data;
       identify a threshold value within the discrete probability distribution of values based on a combination of between-class separation and within-class concentration of the two classes; and
       designate voxels of a current image frame with a value that is below the threshold value as not having the characteristic and with a value that is above the threshold values as having the characteristic; and
    a processor for executing the computer-executable instructions stored in the computer-readable storage medium.

16. The computing system of sub-section 15 wherein the characteristic represents presence of an object within the medium.

17. The computing system of sub-section 15 wherein the intensities are depth-compensated intensities derived from return signals from ground-penetrating radar.

18. A computer-readable storage medium storing computer-executable instructions for controlling a computing system to classify data representing characteristics into classes, the computer-executable instructions comprising instructions that:
    generate a discrete probability distribution of values of training data;
    identify one or more threshold values within the discrete probability distribution of the values of the training data based on a measure of between-class separation of the classes and a measure of within-class concentration of the classes; and
    designate at least one threshold value for classifying the data into the classes.

19. The computer-readable storage medium of sub-section 18 wherein the training data is the discrete probability distribution of a sequence of sets of prior data.

20. The computer-readable storage medium of sub-section 18 wherein the computer-executable instructions further comprise instructions that classify a current set of data using the at least one threshold value.

Growing Volumes in Streaming Images of Depth-Compensated Voxel Intensities

1. A method performed by a computing system for growing objects detected in a medium, the method comprising:
   accessing a sequence of image frames of the medium, each image frame corresponding to an along-medium location, each image frame containing voxels associated with various depths and cross-medium locations at that along-medium location, each voxel having an intensity;
   designating each voxel as being an object voxel or not an object voxel based on analysis of depth-compensated intensities in which the intensities are normalized to account for variations resulting from differences in depth; and
   for image frames in the sequence, identifying in a current image frame, spots that contain one or more spatially connected object voxels;
identifying spots that are connected to objects that were opened when a previous image frame of the sequence was processed;
for identified spots in the current image frame,
when the spot is not connected to a previously opened object, opening a new object that initially contains that spot; and
when the spot is connected to multiple objects that were previously opened, merging into a new object, that spot plus the spots contained in the multiple connected objects; and
for each open object,
when the object is connected to only one spot, growing the object by adding the spot to the object; and
when the object is connected to multiple spots, opening a new object, one for each of those multiple spots.

2. The method of sub-section 1 further comprising:
for spots extracted from the current image frame, when a spot is connected to multiple objects, closing each connected object; and
for open objects, when an object is not connected to a spot or is connected to multiple spots, closing the object.

3. The method of sub-section 2 wherein when a closed object does not satisfy a minimum object criterion, designating the object as being destroyed.

4. The method of sub-section 3 wherein the minimum object criterion is based on minimum extent along the medium.

5. The method of sub-section 1 wherein an object voxel has a spot neighborhood and each object voxel is connected to object voxels in its spot neighborhood.

6. The method of sub-section 1 wherein an object voxel has an object neighborhood and a spot is connected to an object when the spot is within the object neighborhood of an object voxel of a spot of the object.

7. The method of sub-section 1 further comprising calculating a volume of an object as the volume of a voxel times the number of object voxels in the object.

8. The method of sub-section 1 further comprising calculating an energy of an object as a sum of intensities of the object voxels of the object.

9. The method of sub-section 1 further comprising calculating an extent of an object based on a difference between the minimum and maximum cross-medium, along-medium, or depth location of an object voxel of the object.

10. A computing system for detecting objects in a medium, the system comprising:
a storage medium storing:
computer-executable instructions that receive a sequence of image frames of the medium, each image frame having pixels designated as being an object pixel or not being an object pixel based on analysis of intensities that have been depth-compensated to account for variations resulting from differences in depth, wherein connected object pixels form a spot; and
computer-executable instructions that, for image frames of the sequence,
when a spot in an image frame is not connected to an object, create a new object that contains the spot;
when a spot in the image frame is connected to multiple objects, create a merged object that contains the spot and the spots that comprise the multiple connected objects;
when an object is connected to only one spot, grow the object by adding the spot to the object; and
when the object is connected to multiple spots, create a new object for each of those multiple spots; and
a processor for executing the computer-executable instructions.

11. The computing system of sub-section 10 further comprising computer-executable instructions that, for image frames of the sequence, identify spots that are connected to objects.

12. The computing system of sub-section 10 further comprising computer-executable instructions that, for image frames of the sequence,
when a spot in an image frame is connected to multiple objects, terminate the growth of each connected object; and
when an object is not connected to a spot or is connected to multiple spots, terminate the growth of the object.

13. The computing system of sub-section 12 wherein the storage medium further stores computer-executable instructions that, for image frames of the sequence, when an object whose growth has been terminated does not satisfy a minimum object criterion, designate the object as being destroyed.

14. The computing system of sub-section 10 wherein an object voxel has a spot neighborhood and each object voxel is connected to object voxels in its spot neighborhood.

15. The computing system of sub-section 10 wherein the sequence of image frames is generated from ground-penetrating radar return signals.

16. A computer-readable storage medium storing computer-executable instructions for detecting subsurface objects, the computer-executable instructions comprising instructions that:
receive a sequence of image frames, the image frames having been generated from return signals from ground-penetrating radar signals emitted as a vehicle travels, the image frames having voxels, some of the voxels being designated as being an object voxel that may represent a portion of a subsurface object based on analysis of intensities that have been depth-compensated to account for variations resulting from differences in depth; identify spots of an image frame, a spot being one or more connected object voxels; and
for image frames of the sequence,
identify as a new subsurface object a spot that is not connected to a previously identified subsurface object;
identify as a new subsurface object a spot merged with the spots of multiple previously identified subsurface objects to which the spot is connected;
grow a previously identified subsurface object when the subsurface object is connected to only one spot; and
identify as a new subsurface object each spot of multiple spots to which a previously identified subsurface object is connected.

17. The computer-readable storage medium of sub-section 16 wherein the computer-executable instructions further comprise instructions that, for image frames of the sequence, terminate the growth of a previously identified subsurface object that is connected to a spot that is also connected to another previously identified subsurface object, that is not connected to a spot, or that is connected to multiple spots.

18. The computer-readable storage medium of sub-section 17 wherein an object voxel has a spot neighborhood and each object voxel is connected to object voxels in its spot neighborhood.

19. The computer-readable storage medium of sub-section 18 wherein an object voxel has an object neighborhood and a spot is connected to an object when the spot is within the object neighborhood of an object voxel of a spot of the object.

20. The computer-readable storage medium of sub-section 19 further comprising instructions that, for image frames of the sequence, indicate that a previously identified subsurface object that does not satisfy a minimum object criterion is not a subsurface object.

Depth Integration of Depth-Compensated Image Voxel Intensities

1. A method performed by a computing system for generating depth-integrated intensities of voxels for a target image frame of a medium, the target image frame having intensities of voxels that are each associated with a depth and a cross-medium location, the method comprising:
for each intensity in the target image frame, generating a depth-compensated intensity so that the intensities are normalized across depths to account for variations resulting from differences in depth; and
for each cross-medium location, generating a value based on the depth-compensated intensities at various depths at that cross-medium location that are considered to be significant.

2. The method of sub-section 1 wherein the generation of depth-compensated intensities includes, for each of a plurality of depths, generating a mean and a standard deviation of the intensities at that depth in prior image frames and setting the depth-compensated intensities at that depth based on a number of standard deviations that each intensity is above a significant intensity for that depth.

3. The method of sub-section 2 wherein the significant intensity is based on one or more standard deviations above the mean.

4. The method of sub-section 3 wherein the generated value is a sum of the depth-compensated intensities.

5. The method of sub-section 1 further comprising applying an unsupervised binary classifier to the generated values to classify cross-medium locations as being an object location when the cross-medium location has an object voxel at some depth that is part of an object within the medium.

6. The method of sub-section 5 wherein a threshold value for the classifier is generated based on analysis of generated values for prior image frames.

7. The method of sub-section 5 including growing an area representing an object based on object locations that are connected.

8. The method of sub-section 7 wherein the growing of an area includes adding to the area an object location that is connected to an object location within the area, merging areas that are connected to the same object location, and splitting an area that is connected to multiple object locations in the same image that are not connected.

9. The method of sub-section 7 further comprising determining characteristics of an object based on depth-compensated intensities of object voxels at the object locations of the object.

10. The method of sub-section 7 further comprising estimating a volume of an object based on the number of object voxels it contains.

11. A computing system for detecting objects within a medium, the computing system comprising:
a computer-readable storage medium storing computer-executable instructions that:
access a sequence of image frames of the medium, each image frame having an along-medium location and having voxels with intensities at specific depths and cross-medium locations at that along-medium location;
for image frames in a sequence of image frames and for cross-medium locations in the image frames,
generate a depth-integrated intensity for a cross-medium location based on statistically significant intensities at that cross-medium location of that image frame that have been depth-compensated; and
apply an unsupervised binary classifier to the depth-integrated intensity for a cross-medium location to classify whether that cross-medium location is an object location having an object voxel at some depth at that cross-medium location that represents part of an object; and
a processor that executes the computer-executable instruction stored in the computer-readable storage medium.

12. The computing system of sub-section 11 wherein the computer-readable storage medium further stores computer-executable instructions that, for each of a plurality of depths, generate a mean and a standard deviation of the intensities at that depth and sets the depth-compensated intensities at that depth based on a number of standard deviations that each intensity is above a significant intensity for that depth.

13. The computing system of sub-section 12 wherein mean and standard deviation are generated from intensities at that depth in prior image frames of the sequence.

14. The computing system of sub-section 13 wherein the significant intensity is based on one or more standard deviations above the mean.

15. The computing system of sub-section 11 wherein the computer-readable storage medium further stores computer-executable instructions that grow an area representing an object based on object locations that are connected.

16. The computing system of sub-section 15 wherein the computer-readable storage medium further stores computer-executable instructions that determine characteristics of an object based on depth-compensated intensities of object voxels at the object locations of the object.

17. The computing system of sub-section 15 wherein the computer-readable storage medium further stores computer-executable instructions that estimate a volume of an object based on the number of object voxels at the object locations of the object.

18. A computer-readable storage medium storing computer-executable instructions comprising instructions that, for each image frame in a sequence of image frames of a medium,
generate depth-integrated intensities for cross-medium locations based on statistically significant depth-compensated intensities in that image frame; and
classify whether the depth-integrated intensity for each cross-medium location indicates the presence of an object at some depth at that cross-medium location.

19. The computer-readable storage medium of sub-section 18 wherein the depth-integrated intensity for a cross-medium location of an image frame represents a mean of the depth-compensated intensities at that cross-medium location of the image frame.

20. The computer-readable storage medium of sub-section 18 wherein the depth-integrated intensity for a cross-medium location of an image represents a maximum of the depth-compensated intensities at that cross-medium location of the image frame.

System for Detecting Objects in Streaming 3D Images Formed from Data Acquired with a Medium Penetrating Sensor 1. A method performed by a computing system for identifying objects within a medium, the method comprising:
accessing a sequence of image frames of the medium, each image frame corresponding to an along-medium location, each image frame having voxels representing various depths and cross-medium locations at that along-medium location, each voxel having an intensity;
generating a depth-compensated intensity for each voxel that is a normalization of the intensities across depths to account for variations resulting from differences in depth; and
analyzing the depth-compensated intensities to identify cross-medium locations of image frames with object voxels that represent part of an object.

2. The method of sub-section 1 wherein analysis of the depth-compensated intensities includes generating depth-integrated intensities for cross-medium locations of the image frames and applying an unsupervised binary classifier to the depth-integrated intensities of an image frame to classify whether the depth-integrated intensities across the medium represent object voxels or non-object voxels.

3. The method of sub-section 1 wherein analysis of the depth-compensated intensities includes applying an unsupervised binary classifier to each depth-compensated intensity of an image frame to classify each voxel as being either an object voxel or a non-object voxel.

4. The method of sub-section 1 wherein the depth-compensated intensities are further along-medium compensated.

5. The method of sub-section 1 wherein a depth-compensated intensity for a depth is based on a number of standard deviations above a statistically significant intensity for that depth.

6. The method of sub-section 5 wherein the statistically significant intensity is based on one or more standard deviations above a mean of the intensities for that depth.

7. The method of sub-section 6 wherein the mean and the standard deviation for a specific depth in an image frame are based on analysis of intensities for voxels at that depth of some number of image frames prior to that image frame in the sequence.

8. The method of sub-section 1 wherein the image frames are generated based on return signals from a ground-penetrating radar.

9. A computing system for identifying occurrences of a physical characteristic of a medium, the computing system comprising:
a storage medium for storing images of a sequence of image frames of the medium, each image frame corresponding to an along-medium location, each image frame having voxels associated with various depths and cross-medium locations at that along-medium location, each voxel having an intensity;
a component that generates a depth-compensated intensity for each voxel that is a normalization of the intensities across depths to account for variations resulting from differences in depth;
a component that analyzes the depth-compensated intensities to identify object voxels that are part of a physical characteristic of the medium; and
a component that determines which of the object voxels are part of the same occurrence of the physical characteristic.

10. The computing system of sub-section 9 wherein an occurrence of the physical characteristic is presence of an object within the medium.

11. The computing system of sub-section 9 wherein the analysis component applies an unsupervised binary classifier, with a threshold value derived from depth-compensated intensities for voxels from prior image frames, to classify whether voxels from the current image frame are object voxels or non-object voxels.

12. The computing system of sub-section 9 wherein the depth-compensated intensities are further along-medium compensated.

13. The computing system of sub-section 9 wherein the depth-compensated intensities for voxels at a specific depth are based on a number of standard deviations above a statistically significant intensity for that depth.

14. The computing system of sub-section 13 wherein the statistically significant intensity is based on one or more standard deviations above a mean of intensities for that depth.

15. The computing system of sub-section 9 wherein the object voxels are part of the same occurrence of the physical characteristic based on proximity of the object voxels to each other.

16. The computing system of sub-section 15 wherein the component that determines which of the identified voxels are part of the same occurrence of the physical characteristic grows occurrences by adding to an occurrence an object voxel that is connected to an object voxel within the occurrence, merging occurrences that are connected to the same object voxel, and splitting an occurrence that is connected to object voxels in the same image frame that are not connected.

17. A computer-readable storage medium storing computer-executable instructions for detecting an object in a medium, the computer-executable instruction comprising instructions that:
access a sequence of image frames of the medium, each image frame corresponding to an along-medium location, each image frame having voxels representing various depths and cross-medium locations at that along-medium location, each voxel having an intensity;
generate a depth-compensated intensity for each voxel that is a normalization of the intensities across depths to account for variations resulting from differences in depth;
analyze the depth-compensated intensities to identify object voxels that are part of an object within the medium; and
determine which of the identified voxels are part of the same object based on proximity of the voxels within the medium.

18. The computer-readable storage medium of sub-section 17 wherein the instructions that perform analysis further comprise instructions that apply an unsupervised binary classifier with a threshold value derived from depth-compensated intensities for voxels from prior image frames to classify each voxel from the current image frame as an object voxel or a non-object voxel.

19. The computer-readable storage medium of sub-section 17 wherein the depth-compensated intensities are further along-medium compensated.

20. The computer-readable storage medium of sub-section 19 wherein a depth-compensated intensity for a depth is based on a number of standard deviations above a statistically significant intensity for that depth derived from analysis of depth-compensated intensities at that depth within a certain number of image frames of the sequence that are prior to a current image frame.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method performed by a computing system for identifying objects within a medium, the method comprising:
    accessing a sequence of image frames of the medium, each image frame corresponding to an along-medium location, each image frame corresponding to an along-medium location having, for each of a plurality of depths and for each of a plurality of cross-medium locations, a voxel at that depth and at that cross-medium location, each voxel having an intensity;
    generating a depth-compensated intensity for each voxel that is a normalization of the intensities to account for variations resulting from differences in depth such that, for each depth, the depth-compensated intensity for a voxel at that depth is based on the intensity of the voxel and statistically derived characteristics of the intensities of voxels at that depth; and
    analyzing the depth-compensated intensities to identify cross-medium locations of image frames with object voxels that represent part of an object.

2. The method of claim 1 wherein analysis of the depth-compensated intensities includes generating depth-integrated intensities for cross-medium locations of the image frames and applying an unsupervised binary classifier to the depth-integrated intensities of an image frame to classify whether the depth-integrated intensities across the medium represent object voxels or non-object voxels.

3. The method of claim 1 wherein analysis of the depth-compensated intensities includes applying an unsupervised binary classifier to depth-compensated intensities of an image frame to classify each voxel as being either an object voxel or a non-object voxel.

4. The method of claim 1 wherein the depth-compensated intensities are further along-medium compensated.

5. The method of claim 1 wherein a depth-compensated intensity for a depth is based on a number of standard deviations above a statistically significant intensity for that depth.

6. The method of claim 5 wherein the statistically significant intensity is based on one or more standard deviations above a mean of the intensities for that depth.

7. The method of claim 6 wherein the mean and the standard deviation for a specific depth in an image frame are based on analysis of intensities for voxels at that depth of some number of image frames prior to that image frame in the sequence.

8. The method of claim 1 wherein the image frames are generated based on return signals from a ground-penetrating radar.

9. A computing system for identifying occurrences of a physical characteristic of a medium, the computing system comprising:
    a storage medium for storing images of a sequence of image frames of the medium, each image frame corresponding to an along-medium location, each image frame corresponding to an along-medium location having, for each of a plurality of depths and for each of a plurality of cross-medium locations, a voxel at that depth and at that cross-medium location, each voxel having an intensity;
    a component that generates a depth-compensated intensity for each voxel that is a normalization of the intensities to account for variations resulting from differences in depth such that, for each depth, the depth-compensated intensity for a voxel at that depth is based on the intensity of the voxel and statistically derived characteristics of the intensities of voxels at that depth;
    a component that analyzes the depth-compensated intensities to identify object voxels that are part of a physical characteristic of the medium; and
    a component that determines which of the object voxels are part of the same occurrence of the physical characteristic.

10. The computing system of claim 9 wherein an occurrence of the physical characteristic is presence of an object within the medium.

11. The computing system of claim 9 wherein the analysis component applies an unsupervised binary classifier, with a threshold value derived from depth-compensated intensities for voxels from prior image frames, to classify whether voxels from the current image frame are object voxels or non-object voxels.

12. The computing system of claim 9 wherein the depth-compensated intensities are further along-medium compensated.

13. The computing system of claim 9 wherein the depth-compensated intensities for voxels at a specific depth are based on a number of standard deviations above a statistically significant intensity for that depth.

14. The computing system of claim 13 wherein the statistically significant intensity is based on one or more standard deviations above a mean of intensities for that depth.

15. The computing system of claim 9 wherein the object voxels are part of the same occurrence of the physical characteristic based on proximity of the object voxels to each other.

16. The computing system of claim 15 wherein the component that determines which of the identified voxels are part of the same occurrence of the physical characteristic grows occurrences by adding to an occurrence an object voxel that is connected to an object voxel within the occurrence, merging occurrences that are connected to the same object voxel, and splitting an occurrence that is connected to object voxels in the same image frame that are not connected.

17. A computer-readable storage medium storing computer-executable instructions for detecting an object in a medium, the computer-executable instruction comprising instructions that:
    access a sequence of image frames of the medium, each image frame corresponding to an along-medium location, each image frame corresponding to an along-medium location having, for each of a plurality of depths and for each of a plurality of cross-medium locations, a voxel at that depth and at that cross-medium location having voxels representing various depths and cross-medium locations at that along-medium location, each voxel having an intensity;

generate a depth-compensated intensity for each voxel that is a normalization of the intensities to account for variations resulting from differences in depth such that, for each depth, the depth-compensated intensity for a voxel at that depth is based on the intensity of the voxel and statistically derived characteristics of the intensities of voxels at that depth;

analyze the depth-compensated intensities to identify object voxels that are part of an object within the medium; and determine which of the identified voxels are part of the same object based on proximity of the voxels within the medium.

18. The computer-readable storage medium of claim 17 wherein the instructions that perform analysis further comprise instructions that apply an unsupervised binary classifier with a threshold value derived from depth-compensated intensities for voxels from prior image frames to classify each voxel from the current image frame as an object voxel or a non-object voxel.

19. The computer-readable storage medium of claim 17 wherein the depth-compensated intensities are further along-medium compensated.

20. The computer-readable storage medium of claim 19 wherein a depth-compensated intensity for a depth is based on a number of standard deviations above a statistically significant intensity for that depth derived from analysis of depth-compensated intensities at that depth within a certain number of image frames of the sequence that are prior to a current image frame.

* * * * *